US006862867B2

(12) United States Patent
Cady et al.

(10) Patent No.: US 6,862,867 B2
(45) Date of Patent: Mar. 8, 2005

(54) BAG SEALING SYSTEM AND METHOD

(75) Inventors: Derril R. Cady, Manawa, WI (US); Mark W. Taylor, Sr., Lathrop, MO (US); Theodore A. Balek, Lathrop, MO (US)

(73) Assignee: Pack-Tech, L.L.C., Polo, MO (US)

( * ) Notice: Subject to any disclaimer, the term of this patent is extended or adjusted under 35 U.S.C. 154(b) by 0 days.

(21) Appl. No.: 10/345,763

(22) Filed: Jan. 16, 2003

(65) Prior Publication Data

US 2004/0139701 A1 Jul. 22, 2004

(51) Int. Cl.⁷ .............................................. B65B 31/00
(52) U.S. Cl. ........................... 53/434; 53/432; 53/477; 53/86; 53/512
(58) Field of Search .......................... 53/434, 477, 432, 53/435, 52, 86, 509, 510, 512, 513; 156/510, 526, 527

(56) References Cited

U.S. PATENT DOCUMENTS

| | | |
|---|---|---|
| 2,913,863 A | 11/1959 | Sylvester et al. |
| 3,597,897 A | 8/1971 | Gerard |
| 3,699,742 A | 10/1972 | Giraudi |
| 3,775,225 A * | 11/1973 | Schott, Jr. .................. 156/510 |
| 3,779,838 A * | 12/1973 | Wech ....................... 156/583.1 |
| 3,832,824 A | 9/1974 | Burrell |
| 3,958,391 A | 5/1976 | Kujubu |
| 4,164,111 A | 8/1979 | Di Bernardo |
| 4,221,101 A * | 9/1980 | Woods ......................... 53/512 |
| 4,550,548 A | 11/1985 | Owensby et al. |
| 4,578,928 A | 4/1986 | Andre et al. |
| 4,583,347 A | 4/1986 | Nielsen |
| 4,601,159 A | 7/1986 | Mugnai |
| 4,640,081 A * | 2/1987 | Kawaguchi et al. .......... 53/510 |
| 4,798,039 A | 1/1989 | Deglise |
| 4,843,796 A | 7/1989 | Furukawa |

(List continued on next page.)

OTHER PUBLICATIONS

PCT International Search Report, PCT/US04/00716, International Filing Date Jan. 13, 2004, Pack-Tech, LLC, Applicant.

*Primary Examiner*—Louis Huynh
(74) *Attorney, Agent, or Firm*—Mark E. Brown

(57) ABSTRACT

A system for sealing thermoplastic film includes one or more bag sealing units, each comprising a lower vacuum platen and a vacuum chamber cover adapted for sealing engagement on the platen to form a vacuum chamber. A sealing bar assembly includes a sealing bar designed for constant heated operation and a pair of cooling plates which function as heat sinks. The sealing bar assembly is pneumatically reciprocated between a raised, disengaged position and a lowered position with the sealing bar engaging the neck of a bag for hermetically sealing same. The cooling plates clamp the bag neck against a sealing support assembly. A method of sealing a thermoplastic film bag includes the steps of placing a packaging object in a thermoplastic bag and placing the bag on a cradle with the bag neck extending over a bag support assembly. A vacuum chamber cover is placed on the platen and evacuated to form a vacuum chamber. A sealing bar assembly melds the thermoplastic to form a sealed area across the bag neck. A cutoff knife blade severs the end of the bag beyond a sealed area, which extends across its neck.

20 Claims, 21 Drawing Sheets

U.S. PATENT DOCUMENTS

| | | | |
|---|---|---|---|
| 4,845,927 A | 7/1989 | Rapparini | |
| 4,860,523 A | 8/1989 | Teteishi | |
| 4,926,614 A | 5/1990 | Costello et al. | |
| 5,056,292 A | 10/1991 | Natterer | |
| 5,062,252 A | 11/1991 | Kupcikevicius | |
| 5,097,648 A | 3/1992 | Berner et al. | |
| 5,131,213 A * | 7/1992 | Shanklin et al. | 53/477 |
| 5,282,349 A | 2/1994 | Siegel | |
| 5,351,463 A | 10/1994 | Aarts | |
| 5,371,998 A | 12/1994 | Johnson et al. | |
| 5,386,678 A | 2/1995 | Kujubu | |
| 5,435,114 A | 7/1995 | Moehlenbrock et al. | |
| 5,438,883 A * | 8/1995 | McLean | 73/862.632 |
| 5,528,880 A | 6/1996 | Landolt | |
| 5,638,664 A | 6/1997 | Levsen et al. | |
| 5,640,081 A | 6/1997 | Austin et al. | |
| 5,682,727 A * | 11/1997 | Harte et al. | 53/512 |
| 5,692,360 A | 12/1997 | McDonald et al. | |
| 5,784,862 A | 7/1998 | Germano | |
| 5,822,956 A | 10/1998 | Liechi et al. | |
| 5,893,822 A | 4/1999 | Deni et al. | |
| 6,324,818 B1 | 12/2001 | Morness et al. | |
| 2004/0060262 A1 | 4/2004 | Harges et al. | |

* cited by examiner

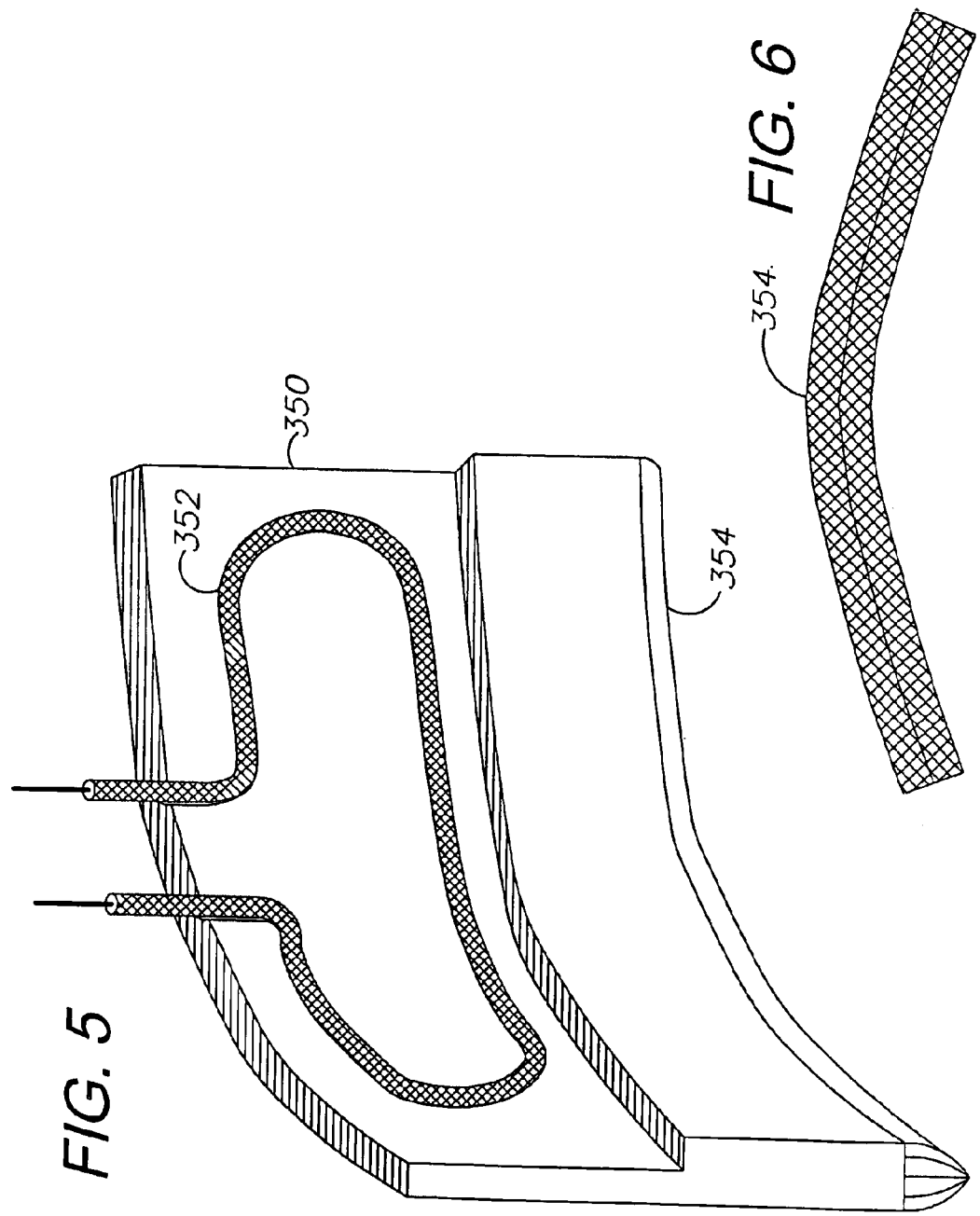

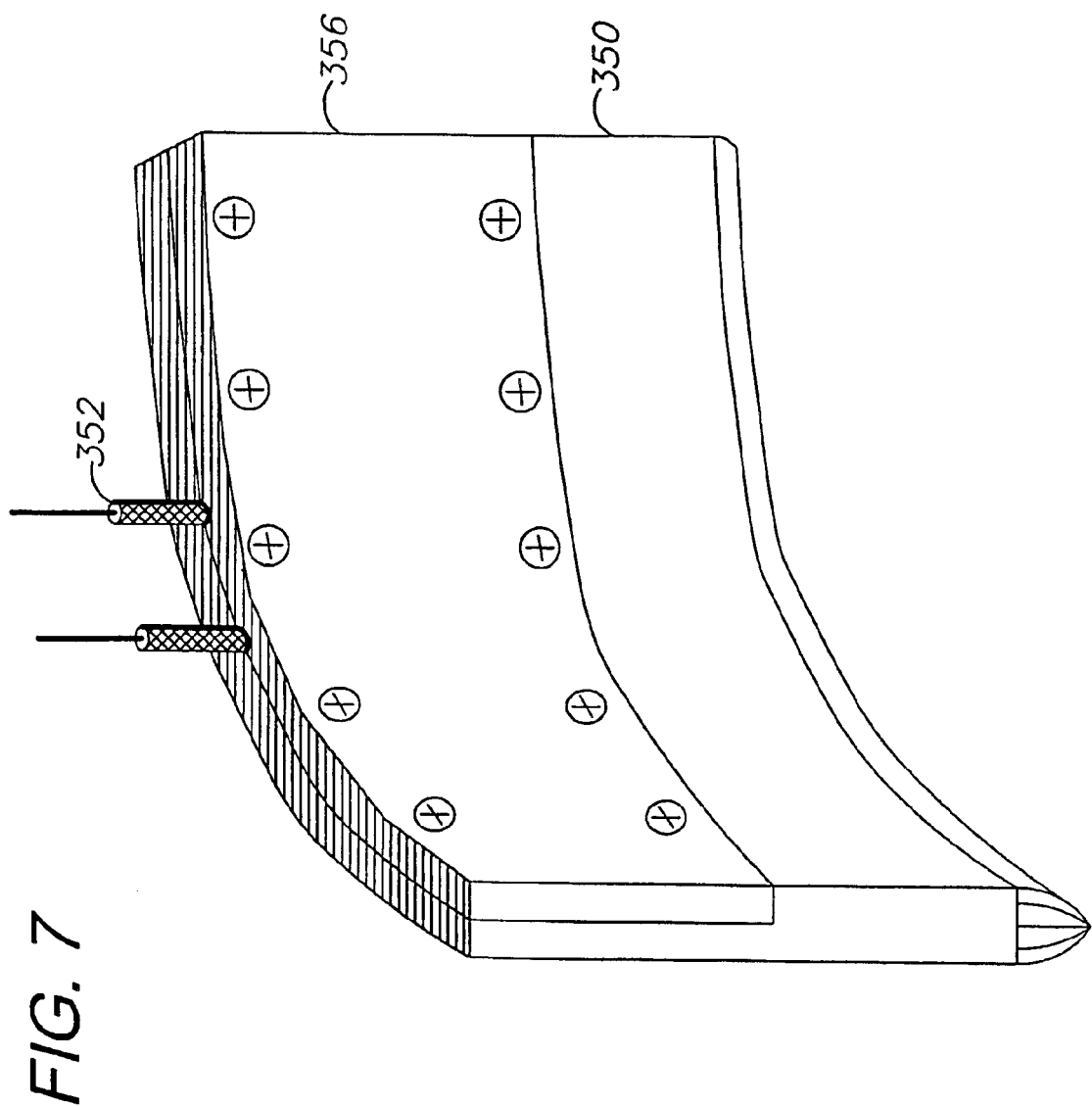

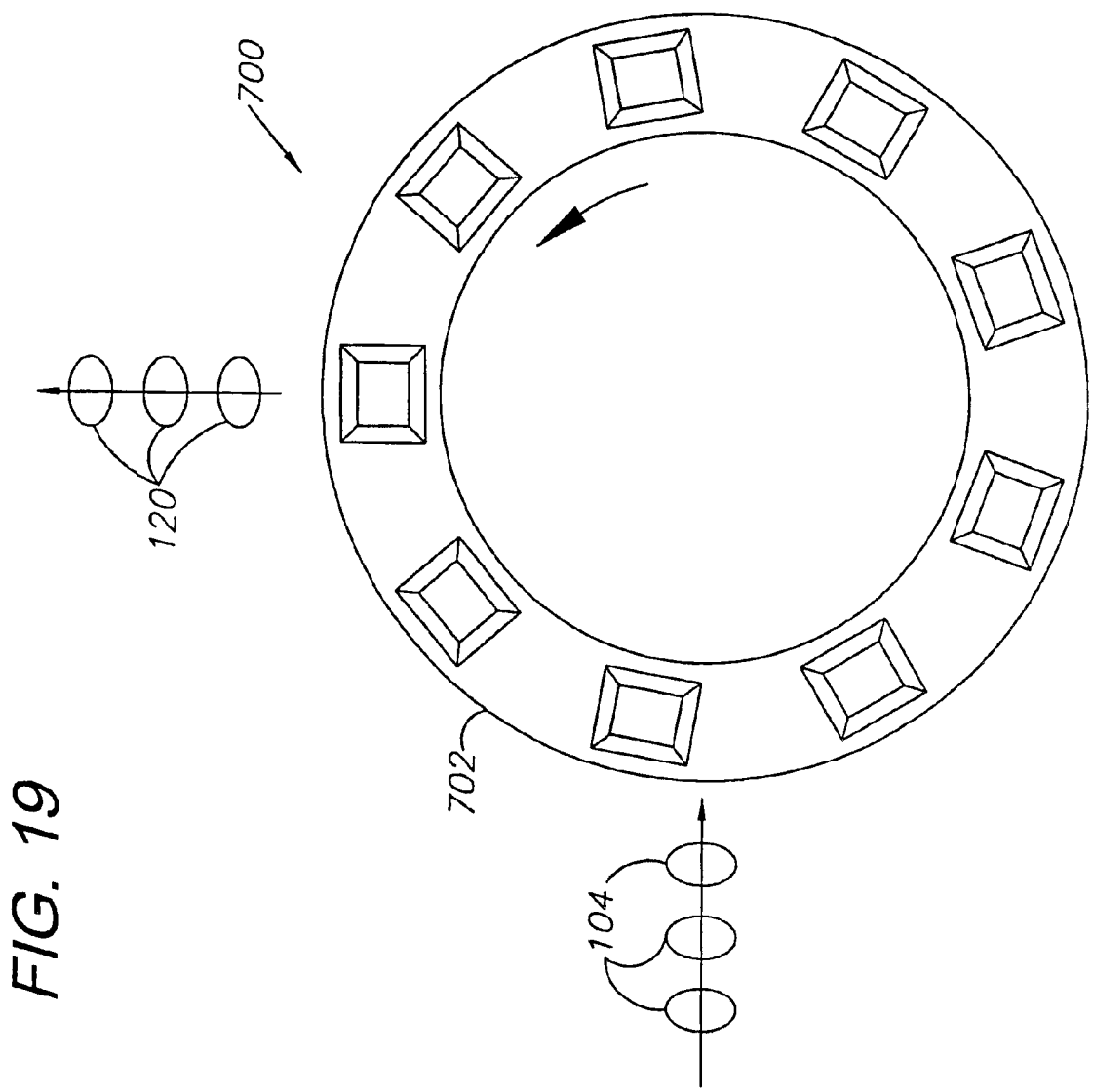

BAG SEALING SYSTEM AND METHOD

BACKGROUND OF THE INVENTION

The present invention relates generally to vacuum packaging, and more particularly to an apparatus and system for thermally sealing bags using a constant temperature heat source located adjacent to one or more heat sinks.

It is known in the prior art to seal perishable items, such as food products, by placing the item in a plastic bag, evacuating a substantial portion of the air within the bag to form a partial vacuum, and heat-sealing the bag opening to hermetically seal the bag and preserve the vacuum. Typically, this process is performed within a vacuum chamber. The bag containing the item or items to be packaged is placed into the chamber, and the chamber is closed. Air is evacuated from the chamber and the open end of the bag is sealed using a heat-sealing bar. As the bar comes into contact with the plastic, the plastic of both walls of the bag is melted, thereby causing the walls to meld or adhere to one another.

Ordinarily, the vacuum chamber comprises two major elements or assemblies, an upper lid or cover assembly that houses the heat sealing mechanism and a blade for trimming excess bag material, and a lower base or platen assembly that holds the bag and product to be packaged, valves, sealing support device, cutting support device, and vacuum pump.

A significant problem in food packaging applications relates to "leakers", which result from defective seals. For example, meats and other packaged foods commonly have natural juices, fat particles, preservatives and other substances trapped in their bags. These substances are sometimes trapped in the bag openings as they are sealing, and prevent the thermoplastic film from closing air-tight across the mouths of the bags. Bag closures can thus be compromised with leak channels that form where the bag portions do not completely seal, which create leakers allowing fluid to leak out and other substances to leak in and potentially contaminate the packaged food products. Leakers tend to be aesthetically unacceptable for retail merchandising because they create unattractive packages, which customers tend to avoid. They can also discharge substances onto surrounding packages, store displays, shipping containers, etc. Leakers can occur in approximately 7% –20% of the thermoplastic bags sealed with current technology. Therefore, achieving complete, fluid-tight seals with minimal "leakers" is an important criterion in the design and operation of bag sealing equipment. A design strategy for eliminating leak passages involves providing a relatively wide area of engagement with crisscrossing sealing lines whereby a leak passage would have to cross multiple sealing lines in order to compromise the bag. On the other hand, equipment designs which place total reliance on single seal lines for bag closures tend to be more susceptible to being compromised by leak passages. For example, much of the current bag sealing equipment provides sealed areas that are only about 3 mm wide, and are thus susceptible to leak channels.

A heat sealing method commonly used in the prior art is known as impulse sealing. Impulse sealing includes the intermittent application of electric current "impulses" to a heating element in a sealing bar. The sealing bar was formed of metal or other materials that transmit heat to the plastic bag. As the sealing bar was brought into contact with the plastic to be melted, an impulse of electrical current was applied to the heating element, which heated the sealing bar long enough to fuse or melt-weld ("meld") the plastic bag. The heating element was then deenergized, thus allowing the sealing bar to cool until the next heating/cooling cycle began.

Such heating/cooling cycles tended to cause operating problems with prior art equipment. For example, delays occurred and energy was wasted as components, such as heating bars, were brought up to operating temperatures and then allowed to cool. Therefore, prior art components with substantial thermal mass tended to incur substantial operating delays and consumed considerable amounts of energy due to their cyclic operations. Moreover, heating/cooling cycles tended to expand and contract thermally conductive components, such as metals and ceramic-core heating elements. The resulting expansion/contraction cycles subjected the equipment to wear. Operators of prior art impulse-type bag sealing equipment thus incurred operating expenses for replacement parts, repairs and downtime.

On the other hand, constant-temperature sealing bars can benefit from greater thermal mass because they tend to be less affected by heat loss to the workpieces. For example, equipment for sealing thermoset plastic bags tends to operate more efficiently and with less wear if operating temperatures are maintained relatively constant. However, thermal energy from constant-heat sealing bars can dissipate throughout the equipment and cause other problems. The present invention addresses these and other problems with the prior art by providing heat sinks on both sides of a heating bar, thus focusing and directing the radiant heat output along a relatively narrow strip or "heat zone".

Heretofore there has not been available a bag sealing system and method with the advantages and features of the present invention.

SUMMARY OF THE INVENTION

In the practice of the present invention, a bag sealing system includes one or more bag sealing units, each comprising a lower vacuum platen and a vacuum chamber adapted for sealing engagement on the platen. A sealing bar assembly includes a sealing bar designed for constant heated operation and located between a pair of heat sink/cooling plates which function as heat sinks. The sealing bar assembly is pneumatically reciprocated between a raised, disengaged position and a lowered position with the sealing bar engaging the neck of a bag for hermetically sealing same. The cooling plates clamp the bag neck against a sealing support assembly. A cutoff knife blade severs the end of the bag beyond a sealed area, which extends across its neck. In the practice of the method of the present invention, a packaging object is placed in a thermoplastic bag, which is then placed on a cradle mounted on the platen with the bag neck extending over a sealing support assembly. A vacuum chamber is placed on the platen and a partial vacuum is drawn in the vacuum chamber, thus evacuating the bag. A sealing bar assembly melds the thermoplastic to form a sealed area across the bag neck. After the vacuum chamber is open, the closed bag is heat-shrunk to a final, reduced-volume configuration.

OBJECTS OF THE INVENTION

It is, therefore, an object of the present invention to provide a constant temperature heat sealing device for vacuum packaging machines that avoids the problems of prior art impulse sealing devices such as oxidation of the element and mechanical stress due to rapid and frequent temperature fluctuations.

It is a further object to provide a constant temperature heat-sealing device that hermetically closes a plastic bag after evacuation of the air inside the bag.

Another object is to provide a constant temperature heat-sealing device wherein the sealing bar may be linear or curved, flat or crowned, as required by the material to be sealed.

Another object of the present invention is to provide a continuous temperature heat-sealing device that works well using relatively large heating elements having an increased thermal mass.

It is a further object of the invention to provide a continuous temperature heat-sealing device that yields a relatively low failure ("leaker") rate in sealed bags.

Another object is to provide a heat-sealing device that can withstand high pressure water wash-down.

A further object of the invention is to accommodate thermoplastics of various thickness, including relatively thick bags.

Yet another object of the invention is to provide bag sealing units adapted for stand-alone, endless-belt and circular conveyor types of operations.

It is a further object to provide a heat-sealing device that is capable of creating a seal width in the range of about 2 mm to 10 mm.

BRIEF DESCRIPTION OF THE DRAWINGS

FIG. 3 is a transverse cross-section thereof taken generally along line 3—3 in FIG. 2a.

FIG. 4b is a fragmentary, side elevational view thereof, taken generally along line 4b—4b in FIG. 4a.

FIG. 5 is an orthographic view of a sealing bar thereof, shown with a cover plate removed.

FIG. 6 is a top plan view of the sealing bar, taken generally along line 6—6 in FIG. 8.

FIG. 7 is an orthographic view of the sealing bar.

FIG. 19 is a top plan view of a circular, carousel-type bag sealing system.

DETAILED DESCRIPTION

Figure 1A:
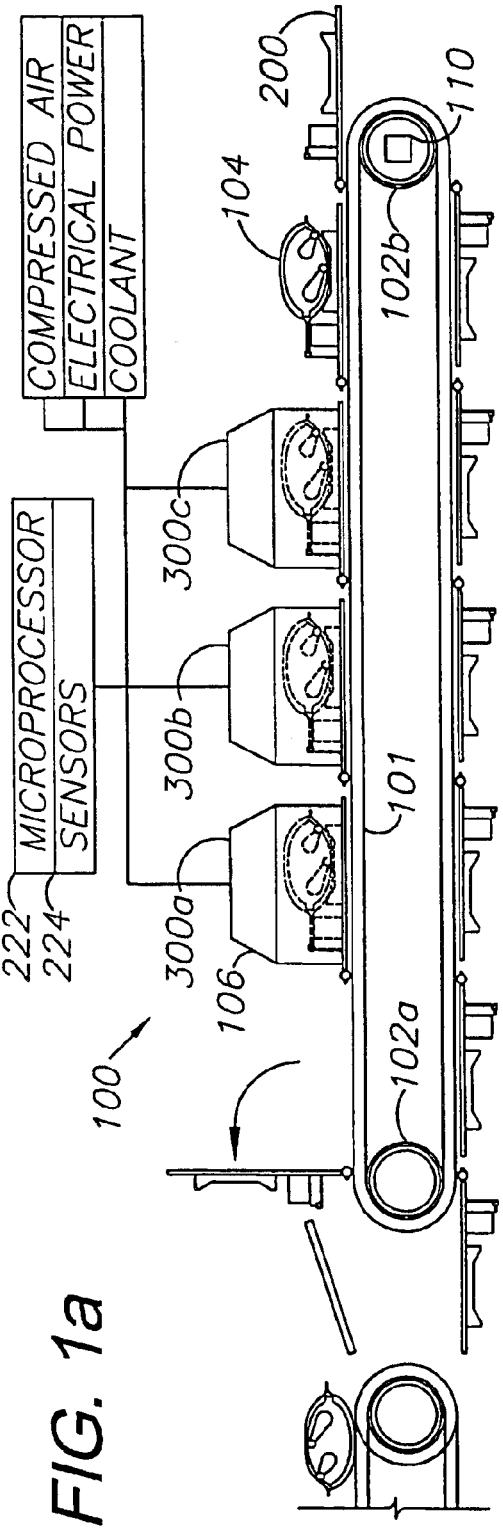
FIG. 1a is a side elevational view of a bag sealing system embodying the present invention.
Figure 1B:
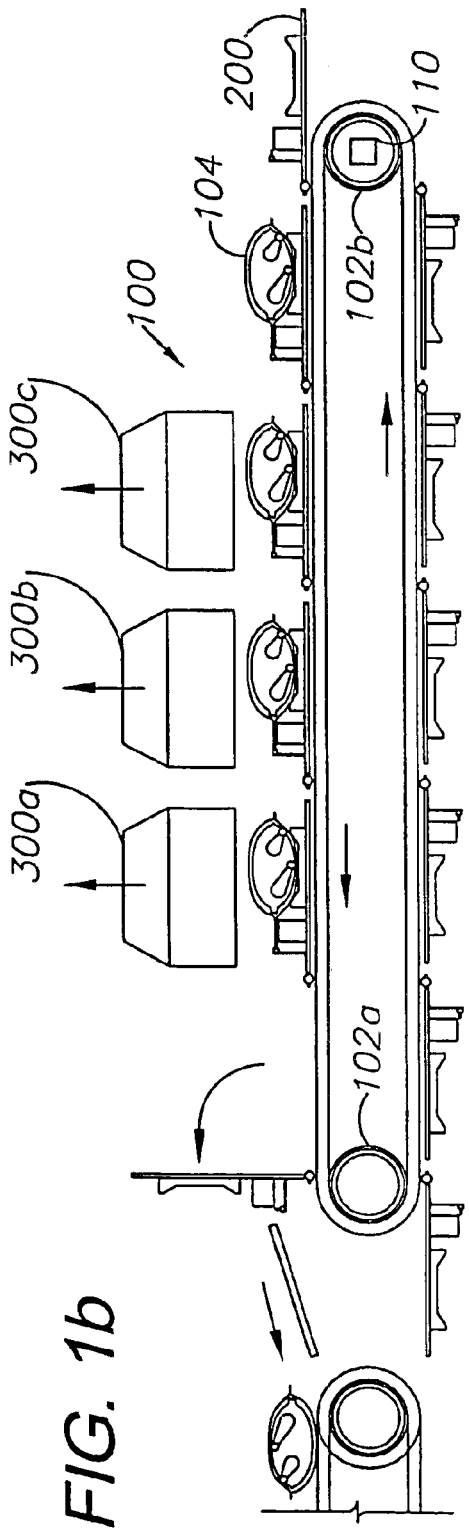
FIG. 1b is another side elevational view thereof, shown with the vacuum sealing units raised.

Turning to the figures, FIGS. 1a and 1b illustrate an automated multiple-chamber vacuum packaging machine 100. The machine includes a continuous, driven chain or belt 101 supported on and driven by an idler roller 102a and a drive roller 102b. As illustrated, a circuitous train of lower vacuum platens 200 are fastened at their leading edges to the belt 101. Preferably, the platens 200 are made of stainless steel. As illustrated in FIG. 1b, the platens are moving counterclockwise in a direction from right to left across the top. The belt 101 is driven by sprocket and bearing assemblies that are fixed to a drive shaft and a free wheeling shaft (not shown). The drive shaft is driven by a servo drive gear reduction motor 110. Three vacuum chambers 300 (individually denoted by numbers 300a, 300b and 300c) are mounted above the belt 101. The platens 200 and respective vacuum chambers 300 collectively form respective bag sealing units 106, which are capable of automated or semi-automated operation (FIGS. 1a, b), or stand-alone operation as individual bag sealing units 106.

The vacuum packaging machine 100 operates as follows. The belt 101 moves counterclockwise (i.e., from right-to-left across the top). Movements can be continuous or intermittent, the latter being adapted for "batch"-type operations, thereby moving the lower vacuum platens 200 underneath the vacuum chambers 300. The packaging machine 100 rate of output is generally governed by the number of vacuum chambers 300 usable simultaneously in operation, together with the duration of the process steps in each unit. Preferably, each vacuum chamber 300 operates independently and simultaneously. The packaging machine 100 uses all available empty vacuum chambers 300 by means of sensors 224 that monitor various operating parameters, such as timing, temperature and pressure with respect to the vacuum chambers 300 and the bag sealing units 106, the rate of chain 101 movement and availability of vacuum chambers 300. A programmable microprocessor controller 222 can be connected to the sensors 224 and other components of the system 100 for controlling its operation, particularly in automated and semi-automated operating modes.

In operation, each independent vacuum chamber 300 performs the following functions. The vacuum chamber cover 302 descends upon a vacuum platen 200 positioned directly below (see 300a, FIG. 1). The vacuum chamber cover 302 forms a seal with the upper surface 202 of the vacuum platen by means of a seal gasket 304 (see FIGS. 2a and 2b). Air within the sealed chamber 300 is then evacuated by means of an exhaust valve 306 located in the top surface of the cover 302 and connected to a suitable vacuum source, such as a compressor. A vacuum sensor (not shown) monitors the air pressure in the chamber 300 and reports the pressure value to the microprocessor controller 222. An air pressure set point has been previously programmed into the microprocessor controller 222. When the set point is reached, the microprocessor controller 222 triggers an air compressor (not shown) to inflate a bladder 308 located on the inner, upper surface of the cover 302. The bladder 308 fills with compressed air, provided through bladder air supply line 318, and expands downward, forcing the sealing bar assembly 310 downward (FIG. 2*b*) and overcoming the return springs 384. The sealing bar 350 is mounted on the lower extremity of the sealing bar assembly 310.

Figure 2A:
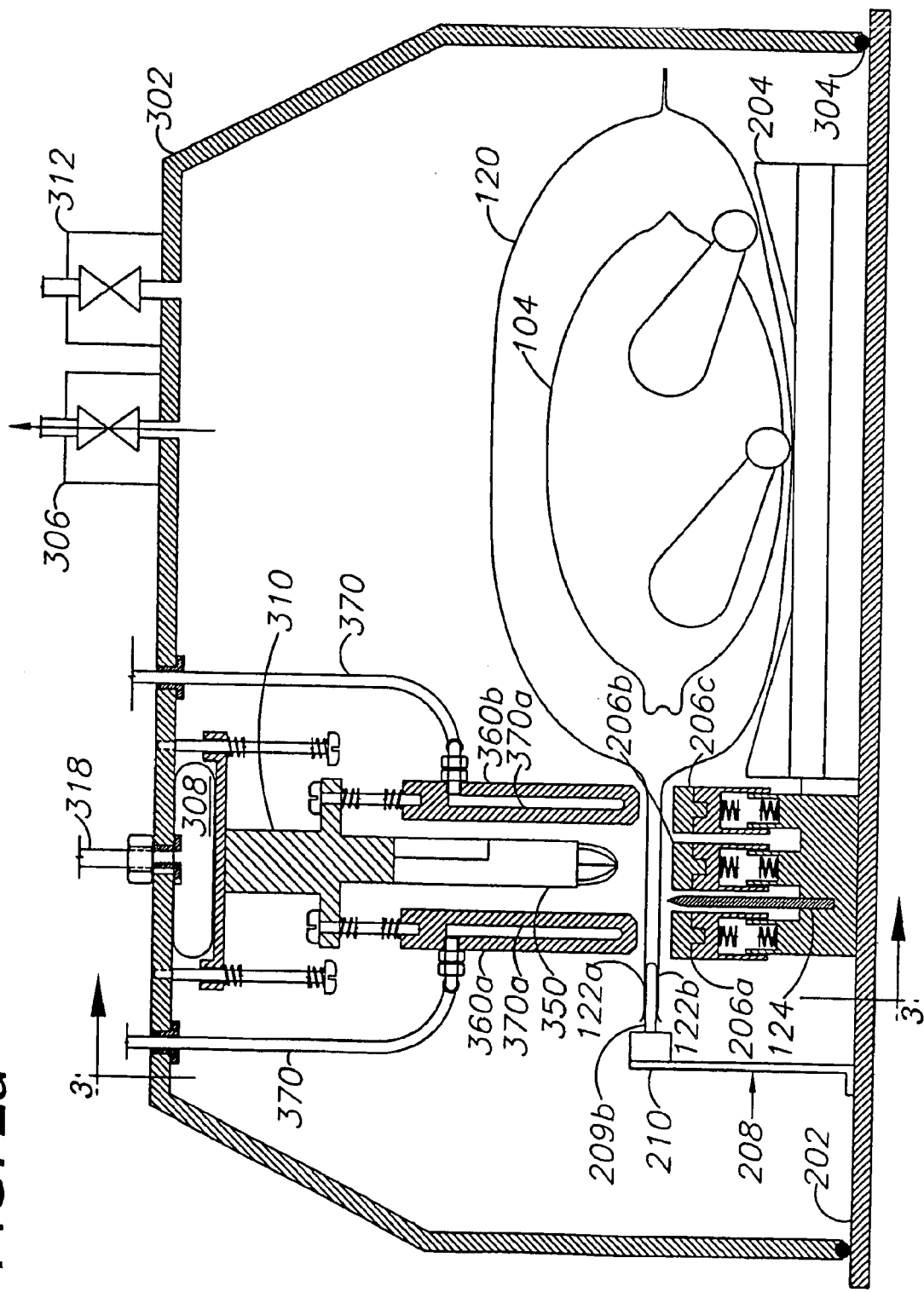
FIG. 2a is a longitudinal cross-section of a bag sealing unit in a closed-cover position.

As illustrated in FIG. 2*a*, prior to closure of the cover 302, an item 104 to be vacuum sealed, in this case a poultry carcass, has been placed inside a plastic vacuum seal bag 120 upon a cradle 204 located on the upper surface 202 of the vacuum platen 200. The bag 120 is made of a thermoplastic film known in the industry for heat sealing and heat shrinking applications. The bag 120 is oriented so that the open neck 122 lies on top of a sealing support assembly 205 with spring-loaded engagement gaskets 206*a*, 206*b* and 206*c*. In addition to lying over the tops of the gaskets 206*a,b,c*, the neck 122 is fitted over a set of neck retention pins 209 that hold the neck 122 of the bag open so that air may be drawn out of the bag 120 by the vacuum created in the chamber 300.

After closing the cover 302 against the platen 200 and evacuating the air inside the chamber 300 to the preprogrammed set point, the sealing bar 350 is forced downward by the expanding inflatable bladder 308, thereby coming into contact with the plastic of the neck 122. The sealing bar 350 continues to move downward, overcoming the upward spring 216 bias of the engagement gaskets 206*a,b,c*. As the sealing bar 350 moves downward the neck 122 is pushed against a fixed cutoff blade 124. The neck 122 of the bag 120 is thereby sheared or cutoff by the cutoff blade 124, which separates a neck cutoff portion 122*c*. The device is calibrated so that downward motion of the sealing bar 350 ceases shortly after the neck 122 of the bag is driven against the cutoff blade 124 and severed.

The sealing bar 350 includes a contact surface 354, which contacts the plastic of the neck 122, thus transferring thermal energy to the plastic film, melting the plastic and causing the upper wall 122*a* and the lower wall 122*b* to meld or fuse together, creating a thermocompressive bond at 122*d*. Shortly before the sealing bar 350 comes into contact with the neck 122, two heat sink/cooling plates 360*a,b* also come into contact with the surface of the neck 122, one on either side of the sealing bar 350, along their respective cooling plate lower edges 362*a,b*. The cooling plates 360*a,b* are attached to the seal bar assembly 310, and are driven downward along with the sealing bar 350 by the force of the inflated bladder 308. The heat sink/cooling plates 360 provide means for cooling the portion of the neck 122 proximate the area of contact between the sealing bar 350 and plastic film, thereby minimizing shrinkage of the neck 122 during heat sealing. The cooling plates 360 also serve to hold the neck 122 in position by clamping same against the engagement gaskets 206*a,c* during the sealing operation.

The three engagement or support gaskets 206*a,b,c* are spring biased, so that they maintain upward pressure against the neck 122 while yielding to the downward force of the sealing bar 350 and the cooling plates 360*a,b*. In addition, the cooling plates 360*a,b* are also spring biased so that towards the end of the downward stroke of the sealing bar assembly 310 the sealing bar 350 may move past the cooling plates 360*a,b*, driving further downward and causing the neck 122 to be cut against the bag cutoff blade 124.

After the sealing bar 350 has achieved its full downward stroke (FIG. 2*b*), compressing engagement gasket 206*b*, an inlet valve 312 is activated and the chamber 300 returns to atmospheric pressure. The cover 302 is then raised and the chain 101 advances the platen 200 with the sealed bag 120 further down the line.

As referenced above, the neck 122 of the bag 120 is held open during the sealing process by a pair of neck retention pins 209*a* and 209*b*. A side view of pin 209*b* may be seen in FIGS. 2*a* through 2*c*.

Figure 2B:
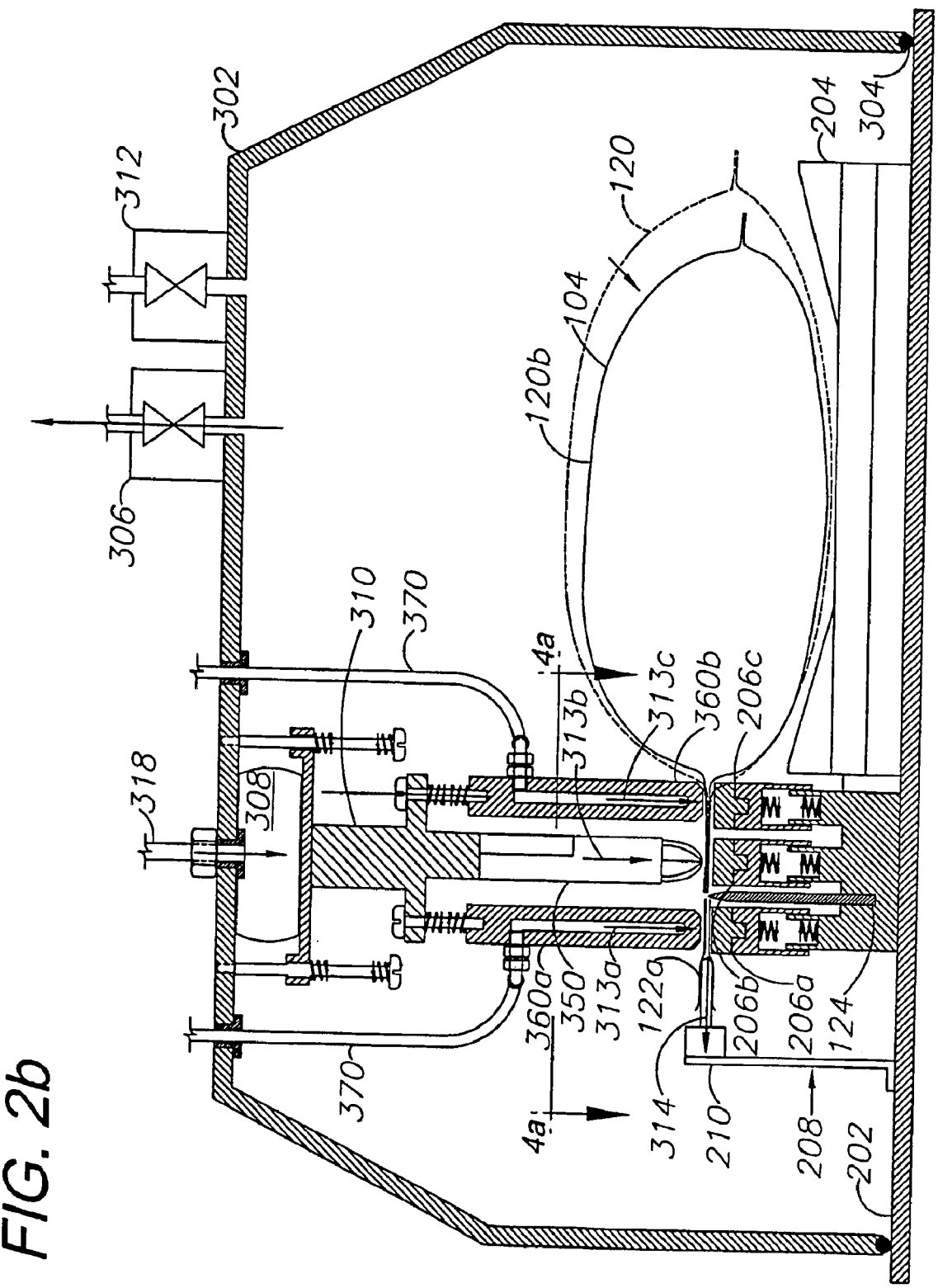
FIG. 2b is a longitudinal cross-section section thereof with a sealing bar assembly engaged.

FIG. 2*b* illustrates the downward travel of the sealing bar assembly 310 with arrows 313*a*, 313*b* and 313*c* indicating the downward direction of travel. Arrow 314 indicates the direction of the final evacuation of air from the bag 120, which is achieved just prior to incision of the neck 122 by the cutting blade 124. Dashed line 120*a* indicates the relative size of the bag 120 prior to the final expulsion of air which reduces it to the size indicated by the solid line 120*b*. FIG. 2*b* also illustrates the bladder 308 in its inflated state.

Figure 2C:
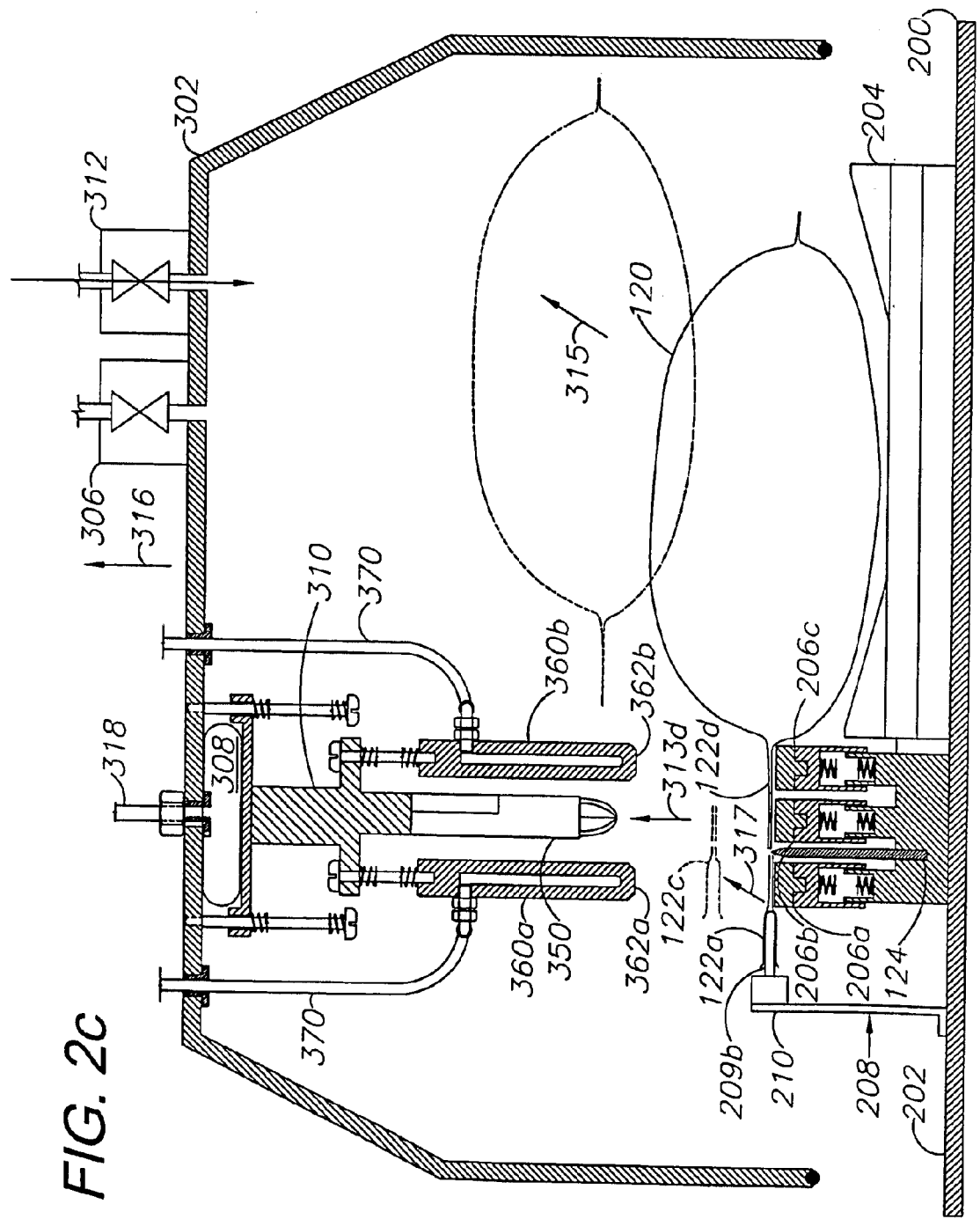
FIG. 2c is a longitudinal cross-section section thereof with the vacuum chamber raised.

As shown in FIGS. 2*a*–*c*, the cradle 204 may be formed with a concave upper surface to receive an item 104 having a curved or rounded shape.

FIG. 2*c* illustrates the apparatus at the conclusion of a cycle, in which the cover 302 has been lifted off of the platen 200. The sealed bag 120 is shown being removed from the cradle 204. Arrow 315 indicates the upward direction of travel of the bag 120 as it is being removed. It should be appreciated that removal of the sealed bag 120 typically occurs after full retraction (lifting) of the cover 302. Arrow 313*d* indicates the upward direction of travel of the seal bar assembly 310 as it is retracted upwards by expulsion of air from the bladder 308. Arrow 316 indicates the upward direction of travel of the cover 302 as it is raised above the platen 200.

In FIG. 2*c* the neck 122 is shown after being separated by the cutting blade 124. The portion of the neck 122 remaining attached to the body of the bag 120 contains the sealed portion of the neck 122*d* (see FIG. 14 for a top view of the sealed portion 122*d* of the neck 122). The cut-off remnant 122*c* of the neck 122 is ejected from the neck retention pins 209, as shown by arrow 317 indicating the upward direction of travel, and phantom lines indicating the ejected neck remnant 122*c*.

Figure 3:
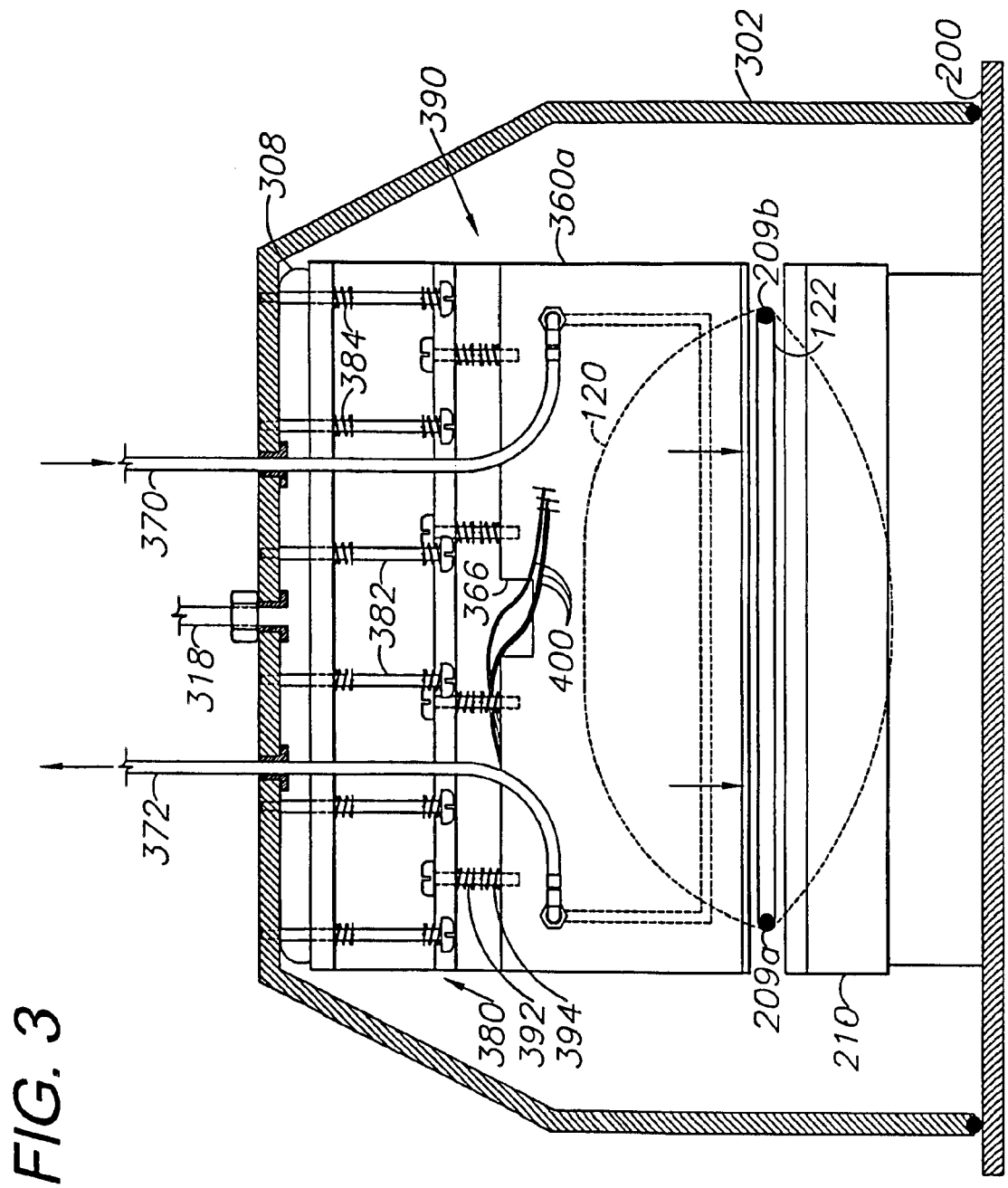

FIG. 3 is a partial cross-sectional view along line 3—3 in FIG. 2*a*. The cover 302 and the platen 200 are shown in cross section and the plastic bag 120, the neck and in the in a and to the 122 and the pins 209*a,b* are shown in phantom lines. As illustrated, the bladder 308 is located on the upper inside surface of the cover 302 and is in communication with an air supply hose 318 which is in further communication with an air pump or compressor (not shown). A seal bar assembly suspension 380 comprises spring biased bolts 382 that support the seal bar assembly 310 by attachment to the upper inside surface of the cover 302. The springs 384 force the assembly 310 upward, squeezing against the bladder 308 when the assembly 310 is in the retracted position. When air pressure to the bladder 308 is increased through the air supply hose 318, the force exerted by the expanding bladder walls overcomes the tension of the springs 384, causing the assembly 310 to slide downward along the shafts of the bolts 382.

A cooling plate suspension system 390 is also illustrated in FIG. 3. The cooling plates 360*a,b* are attached to the sealing bar assembly 310 via bolts 392 mounting return springs 394. When the cooling plates 360*a,b* contact respective engagement gaskets 206*a,c*, the tension in the springs 394 may be overcome by a greater force associated with the downward travel of the cooling plates 360*a,b*.

The elongated, convex side of the cooling plate 360a is illustrated in FIG. 3, including a notch 366 in the upper surface of the cooling plate 360a which provides egress for electrical supply wiring 400. The wiring 400 conducts a controlled current to the heating element 352 (FIG. 5). The heating element 352 supplies thermal energy to the sealing bar 350, which is thus maintained at a selected, relatively constant temperature. Typically, the thermal energy supplied to the sealing bar 350 is regulated by controlling the current applied to the heating element 352 through setting a desired temperature value in a microprocessor-controlled thermostat (not shown).

Water inlet and outlet lines 370, 372 lead to and from the cooling plates 360a,b. During operation of the vacuum packaging machine 100, cool water (or other suitable coolant) is provided to the interior of the cooling plates 360a,b for circulation through internal coolant passages 370a,b. The temperatures of the surfaces of the cooling plates 360a,b are thereby reduced, concurrently lowering the temperature of the portion of the plastic bag 120 contacted by the cooling plates 360a,b during sealing.

Figure 4A:
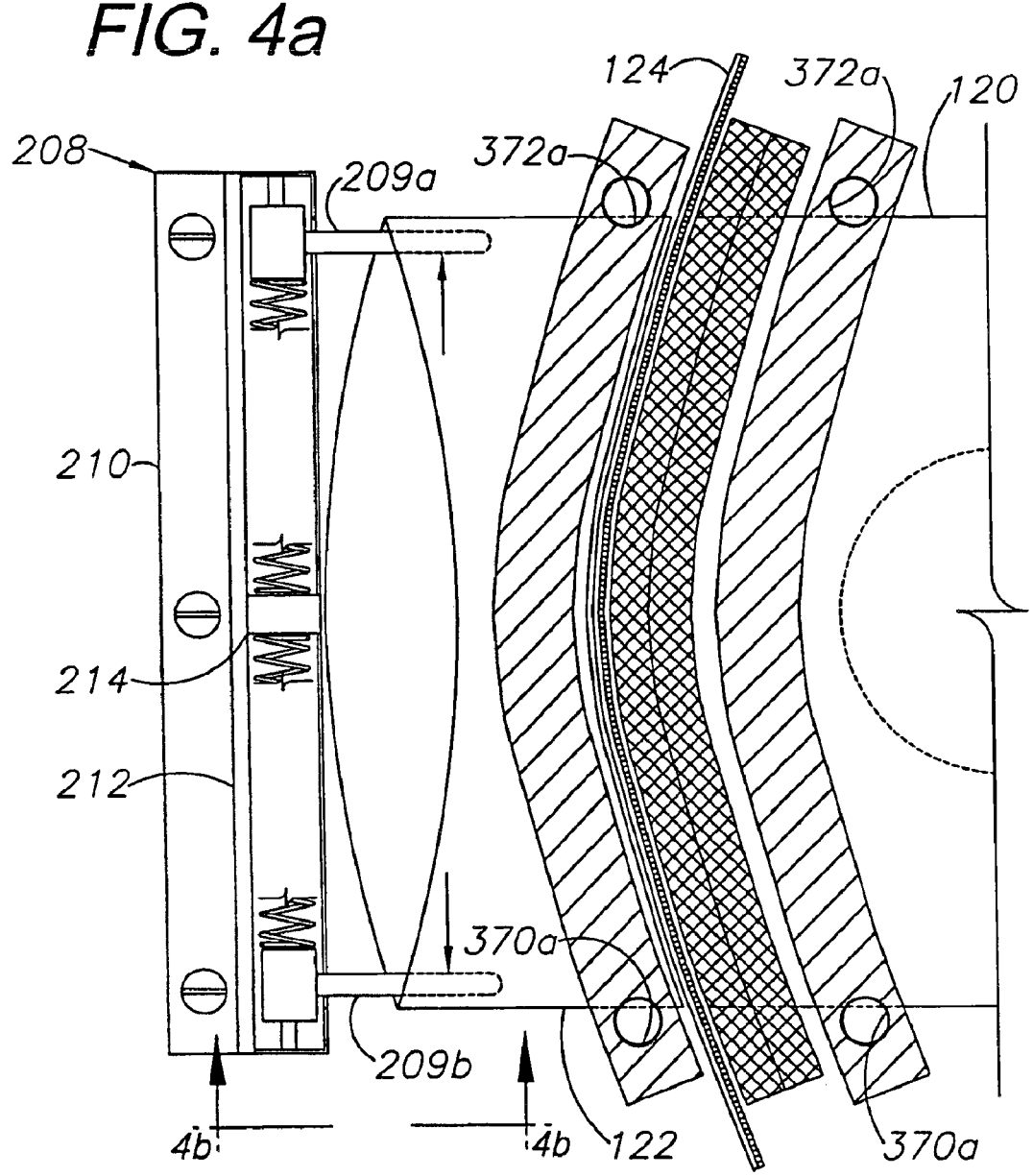
FIG. 4a is a fragmentary, top plan view thereof, particularly showing the sealing bar assembly.

FIG. 4a is a top plan view of the preferred embodiment of the neck retention structure 208. It comprises a pair of pins 209a and 209b that extend outward from a neck retention bracket 210 that holds a guide tube 212 in which the pins 209a,b are urged outwardly by respective springs 214a,b. The pins 209a,b travel along the guide tube 212 during operation of the device. When the bag neck 122 is placed over the engagement gaskets 206, the pins 209a,b are compressed inwardly towards the center of the guide tube 212. Releasing the pins 209a,b stretches the bag opening to its full open, extended position for maximum effective sealing at 122d.

Figure 4B:
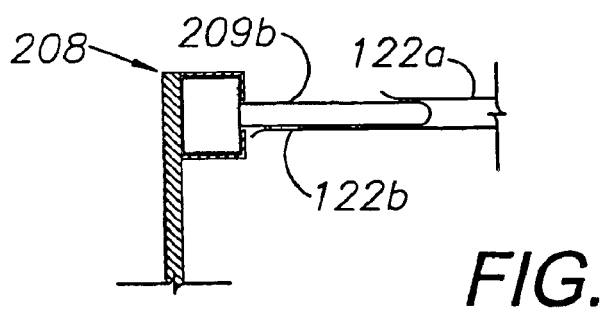

The neck 122 is held open during the sealing process and, as illustrated in FIG. 4a, has just been severed by the cutting blade 124. FIG. 4b is an end view of the neck retention structure 208, including a side view of neck retention pin 209b.

As an alternative to the spring-biased neck retention structure 208, a motorized configuration with a screw-threaded rod driven by a suitable servo motor controlled by the microprocessor controller 222 can be provided and can reciprocate the neck retention pins 209a,b inwardly and outwardly.

Figure 8:
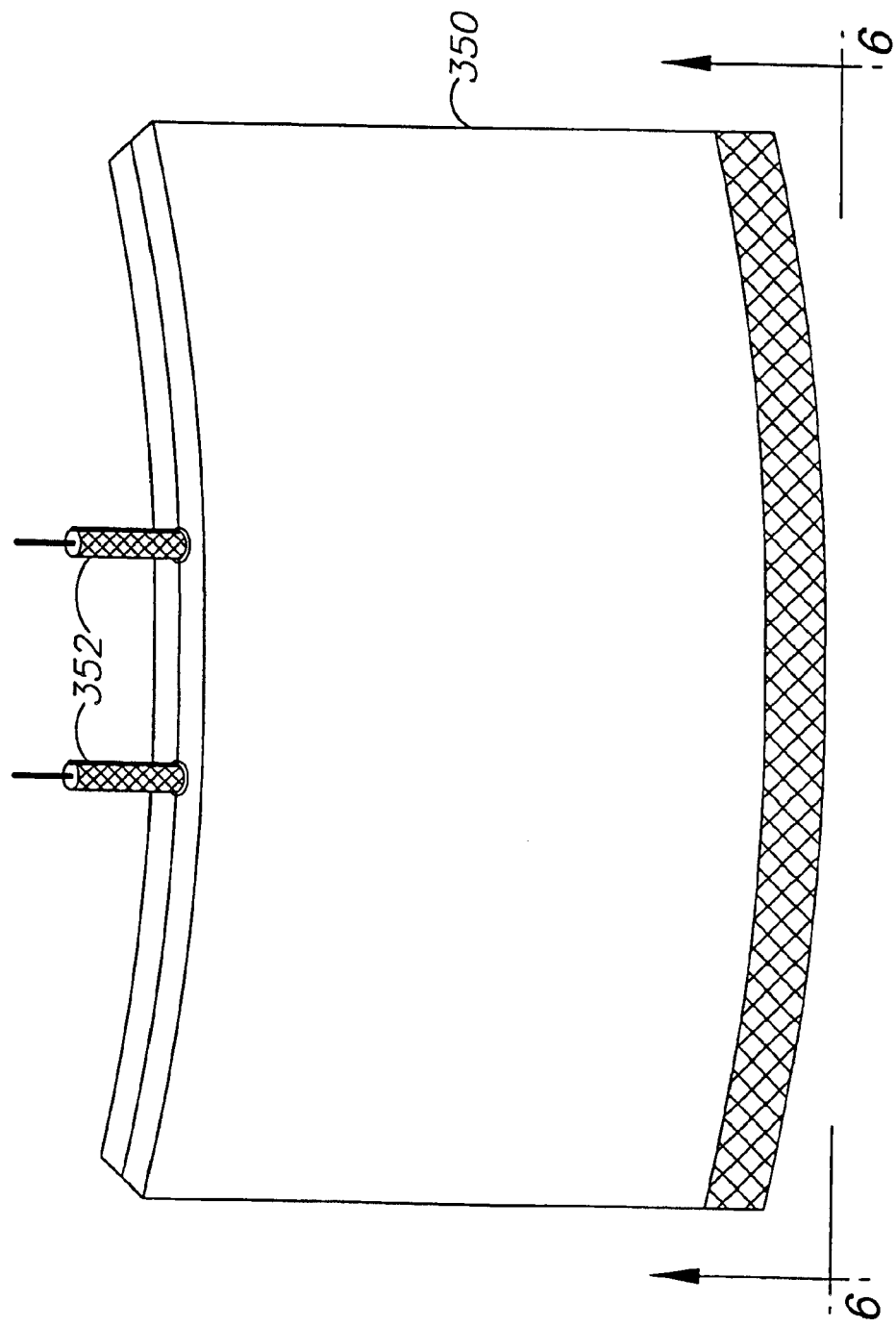
FIG. 8 is an elevational view thereof.

FIG. 5 is an orthographic view of a curved sealing bar 350 with the cover plate removed to show the tubular heating element 352 that provides constant sealing temperature. FIG. 5 also shows the contact surface 354 of the sealing bar 350 designed to provide a cross-hatch pattern when melting the sealed plastic of a vacuum bag 120. FIG. 6 is a bottom view of the sealing bar 350 showing the cross-hatch pattern in greater detail. This cross-hatch pattern permits the device to form a seal through contaminated plastic as well as through gathered layers of plastic created by irregularly shaped products. In particular, multiple, crisscrossed meld lines are formed and tend to cut across contaminated substances and gathered plastic layers, forming multiple barriers to leakage. FIG. 7 is an orthographic view of the sealing bar 350 of FIG. 5 with the cover plate 356 in place. FIG. 8 is an isometric view of the front of the sealing bar 350 with the top portion of the sealing bar tilted slightly toward the viewer.

Figure 10:
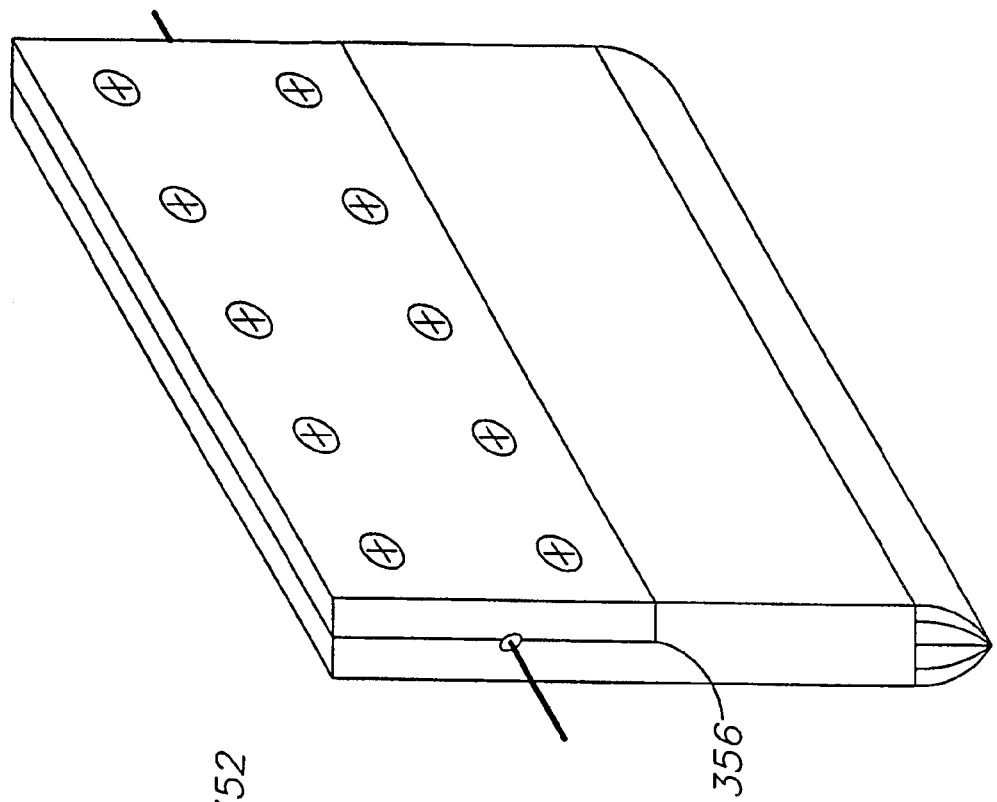
FIG. 10 is an orthographic view of the modified, straight sealing bar.
Figure 9:
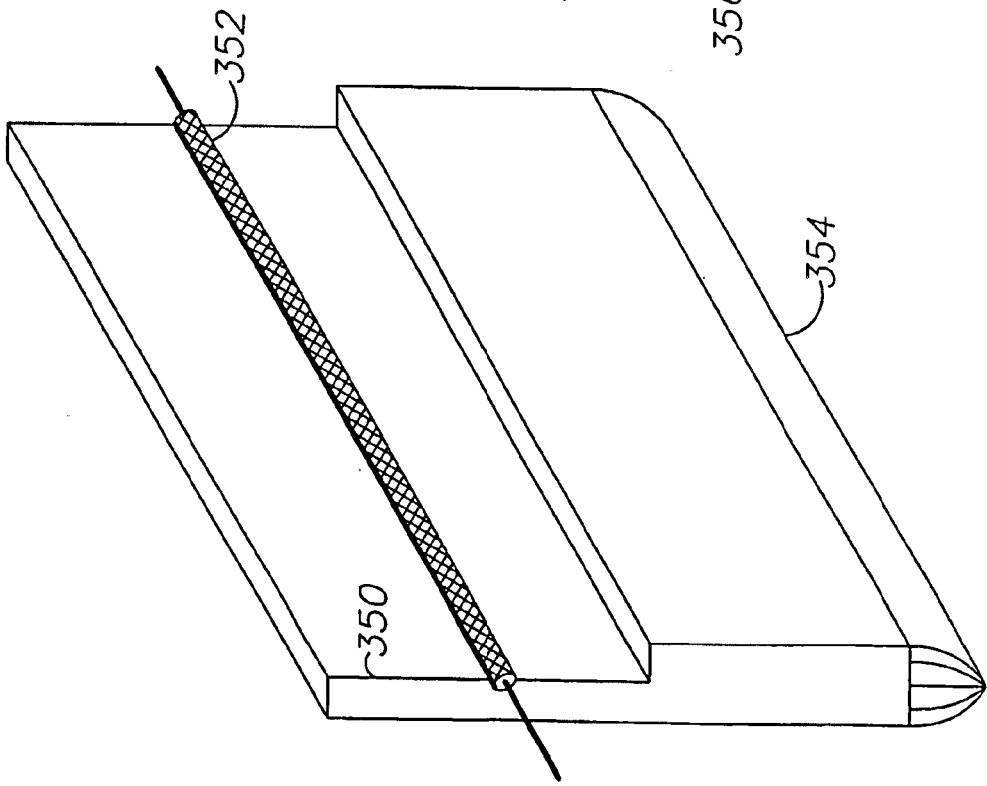
FIG. 9 is an orthographic view of a modified, straight sealing bar, shown with a cover plate removed.

FIG. 9 is an orthographic view of a straight or linear sealing bar 350 with the cover plate 356 removed to show the straight tubular heating element 352 used to create a constant temperature heat source. The contact surface 354 of the sealing bar 350 shown in FIG. 9 has a cross-hatch pattern. FIG. 10 is an orthographic view of the sealing bar 350 of FIG. 9 with the cover plate 356 in place.

Figure 11:
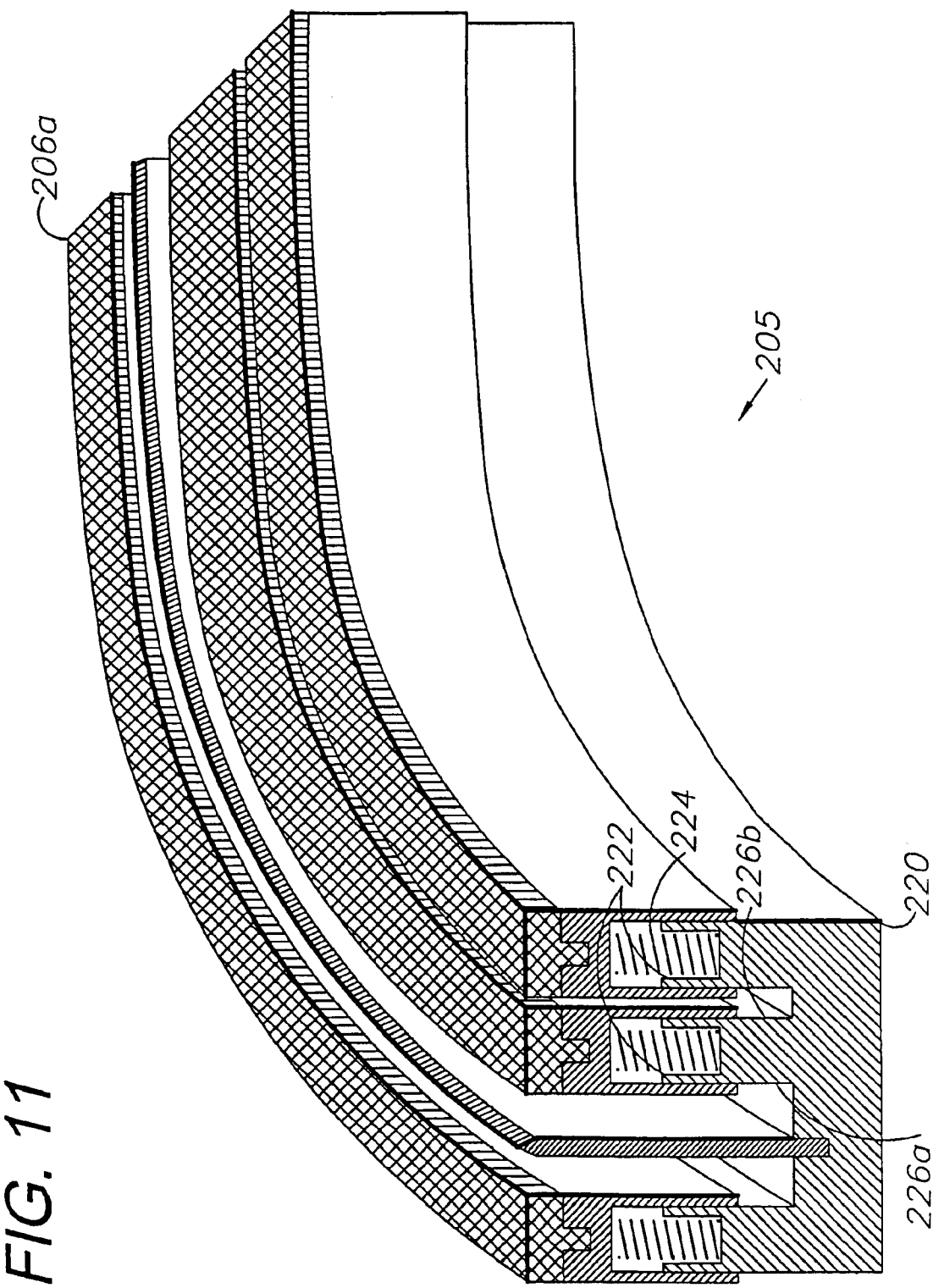
FIG. 11 is an orthographic view of a sealing support assembly.

FIG. 11 is an orthographic view of the sealing support assembly 205 including the engagement gaskets 206a, 206b and 206c, and the bag cutoff blade 124. A sealing support base 220 includes secondary channels 222 for receiving springs 224, a primary major channel 226a within which is mounted the cutoff blade 124, and a secondary major channel 226b which defines and separates engagement gaskets 206b and 206c. The gaskets 206a, 206b and 206c fit over channels 222 and rest upon springs 224. The gaskets 206a, 206b and 206c may include a contact surface having a cross-hatched pattern. The arrangement shown in FIG. 11 would be appropriate for use with a curved sealing bar as shown in FIG. 7.

Figure 12:
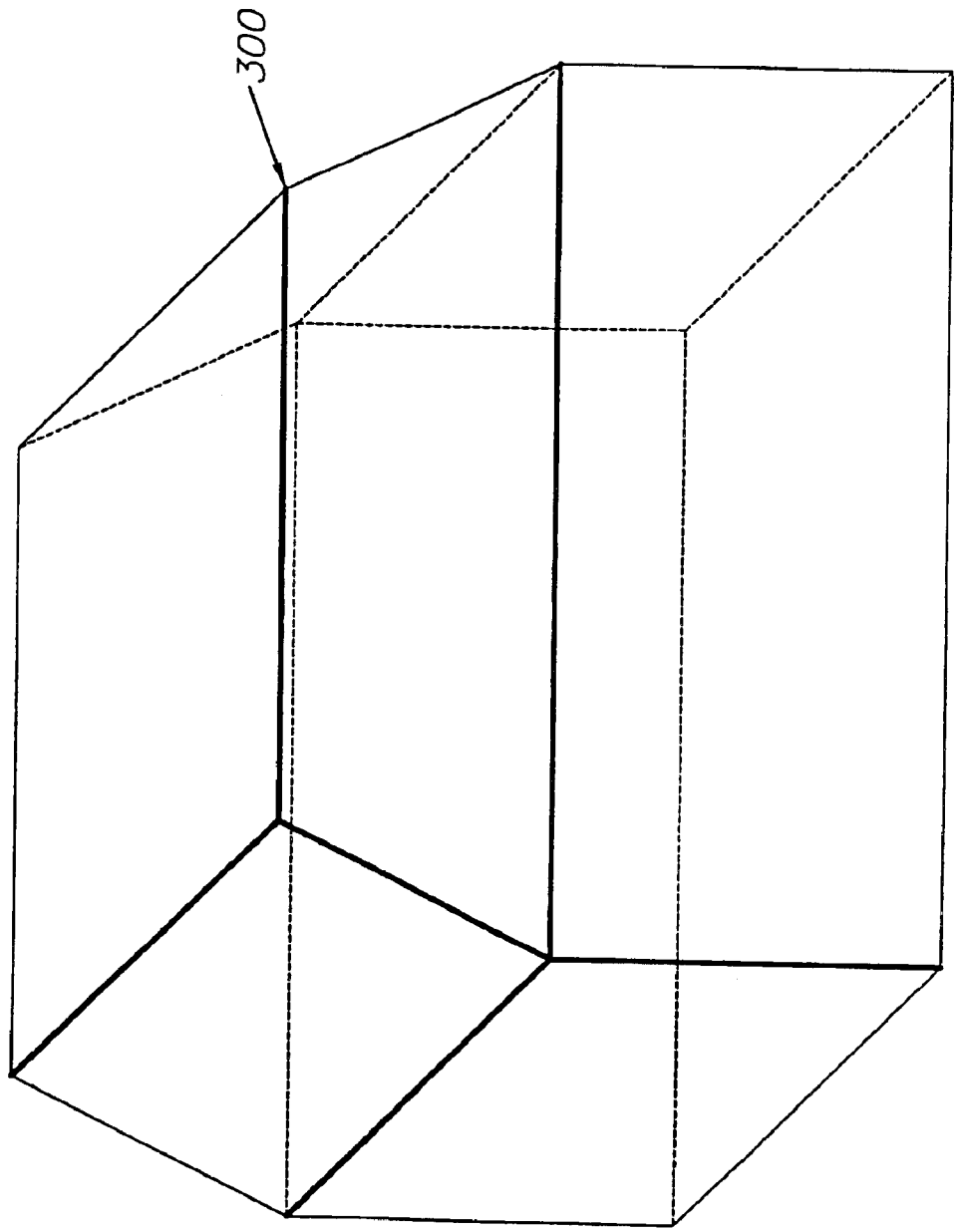
FIG. 12 is orthographic view of a vacuum chamber cover.

FIG. 12 is an upper, front, orthographic view of the vacuum chamber cover 300.

Figure 13:
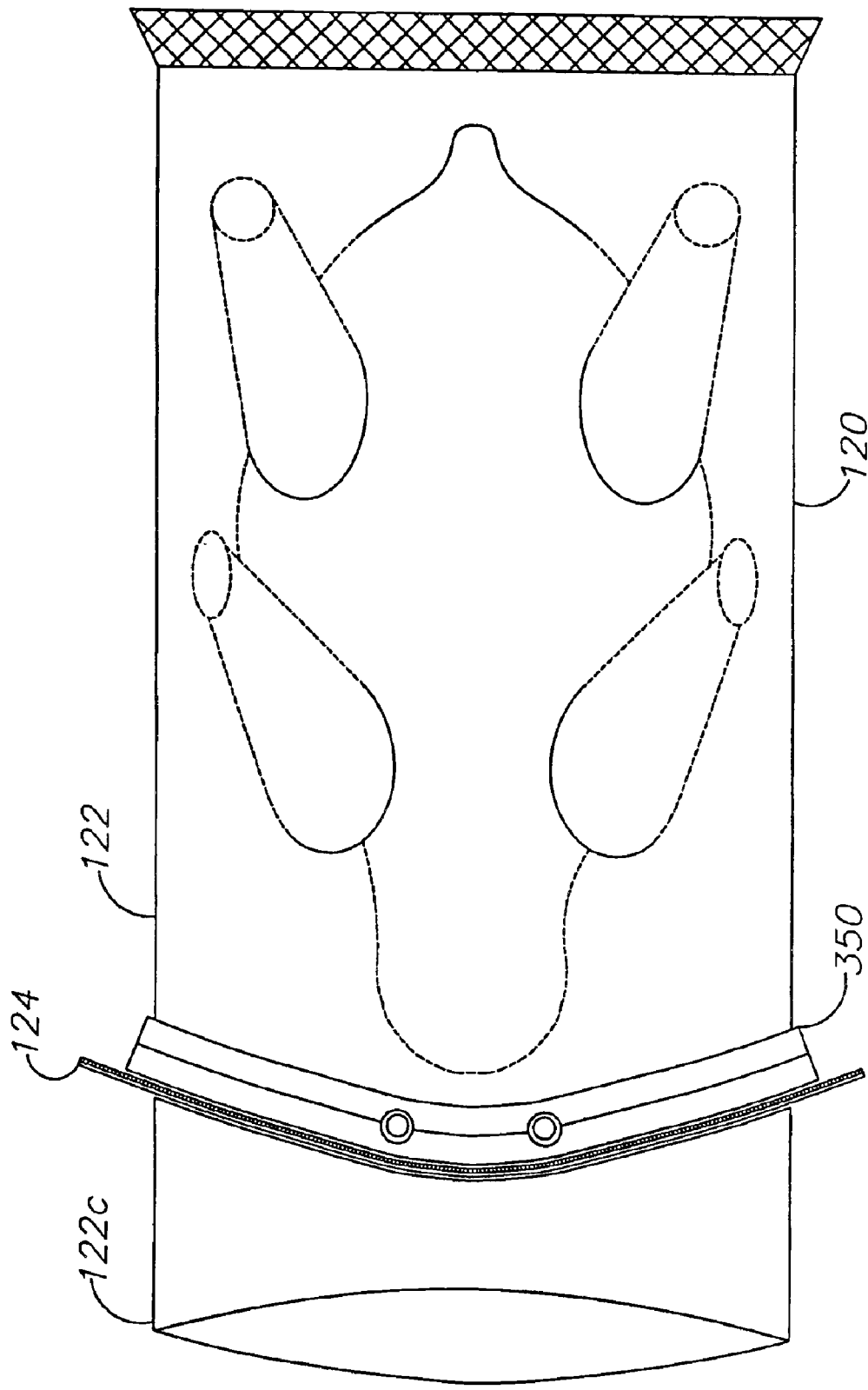
FIG. 13 is a top plan view of a bag containing a poultry carcass, with the sealing bar and cutoff blade shown in position for sealing and cutting off the bag.

FIG. 13 is a fragmentary plan view of the bag 120 containing the item to be packaged 104, the sealing bar 350 positioned above the neck 122 of the bag 120, the cutting blade 124, and a severed portion (remnant) 122c of the neck 122.

Figure 14:
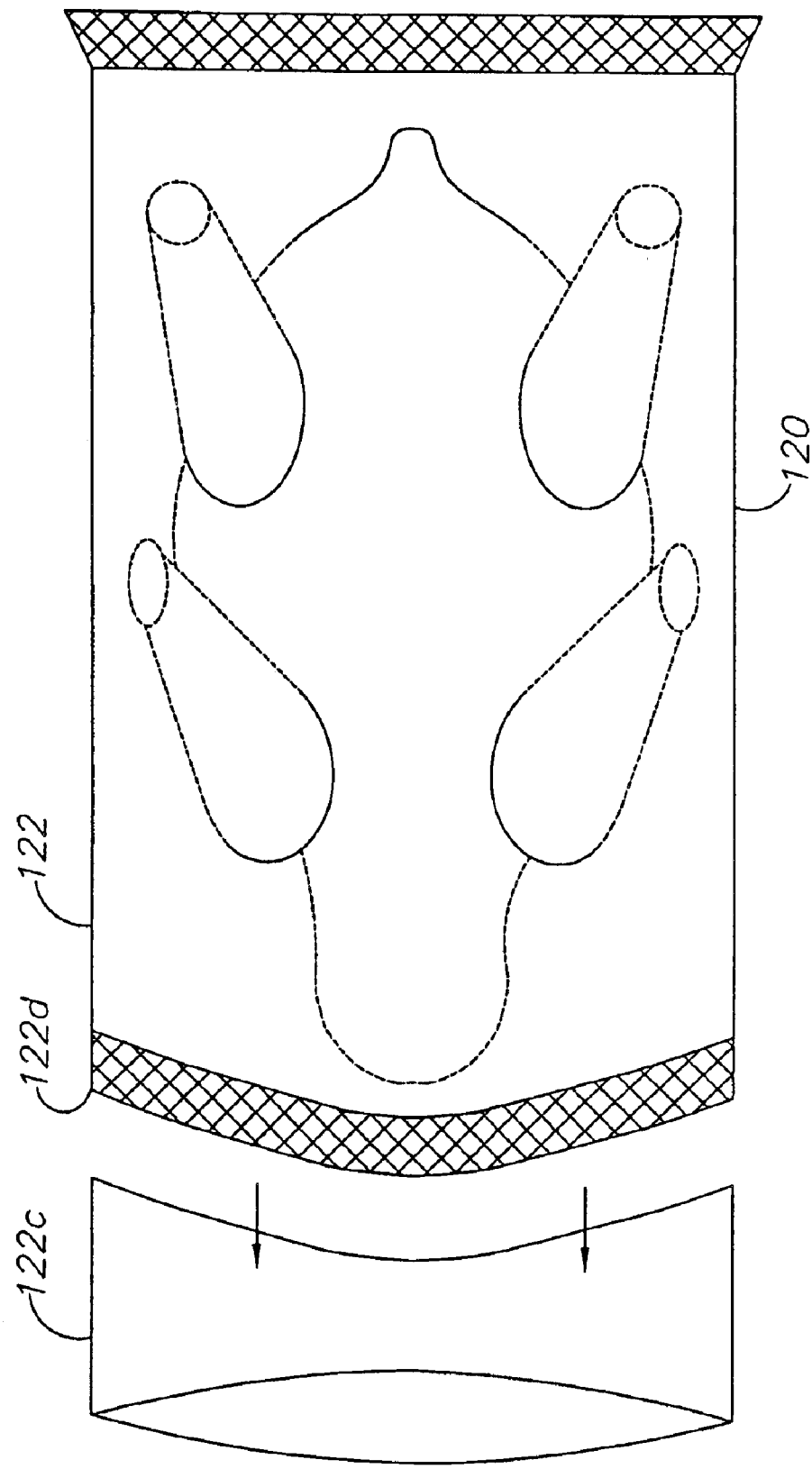
FIG. 14 is a top plan view of the sealed bag.
Figure 15:
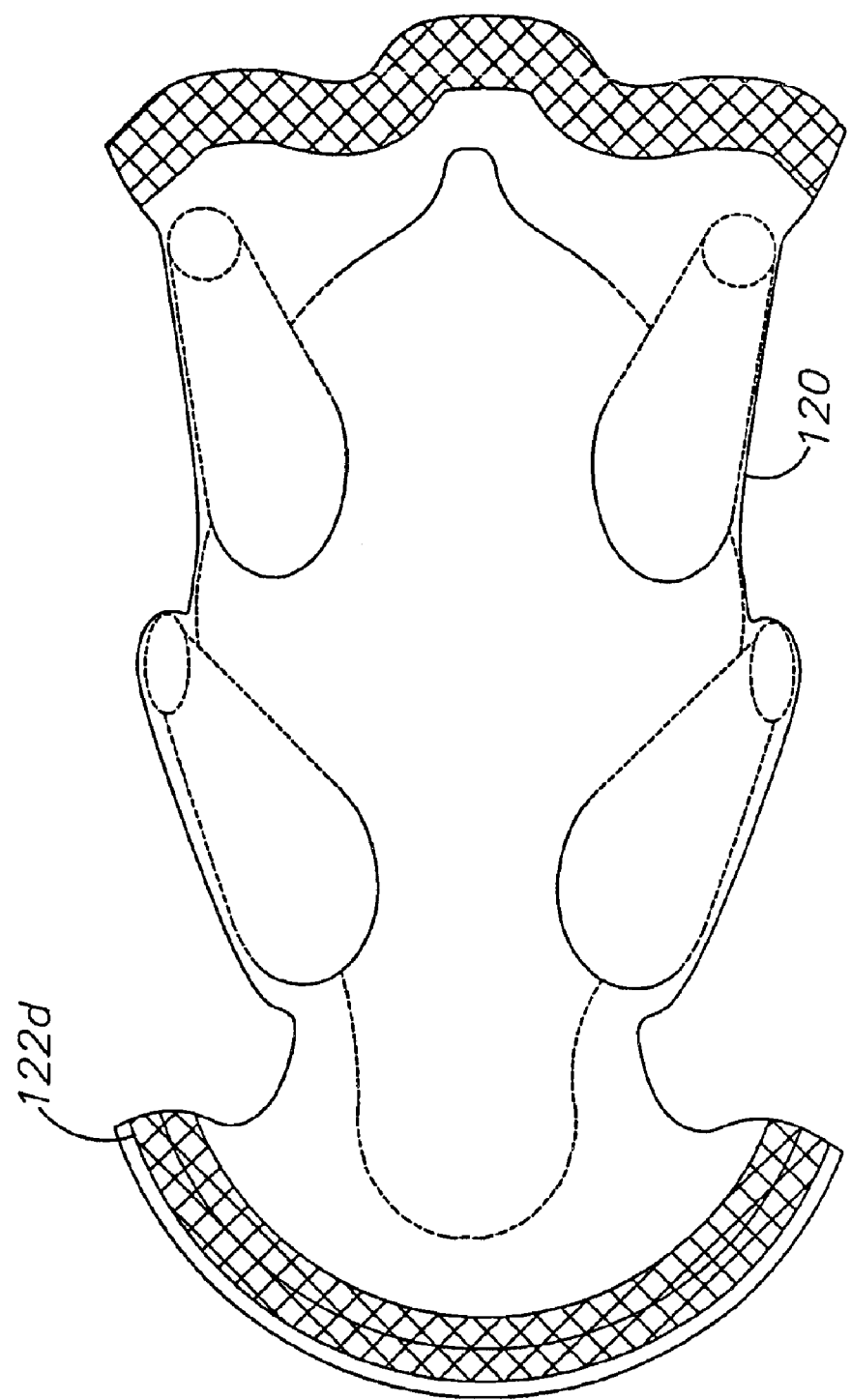
FIG. 15 is a top plan view of the sealed bag, shrunken to its final configuration.

FIG. 14 is a plan view of the bag 120 of FIG. 13 showing the neck remnant 122c severed and removed from the main portion of the bag 120 and the seal 122d formed across the neck 122. After vacuum sealing according to the method of the present invention, a subsequent process occurs in the packaging process. The sealed bag 120 is deposited in a hot water bath or steam tunnel causing the thermoplastic material of the bag 120 to shrink as illustrated in FIG. 15.

Figure 16:
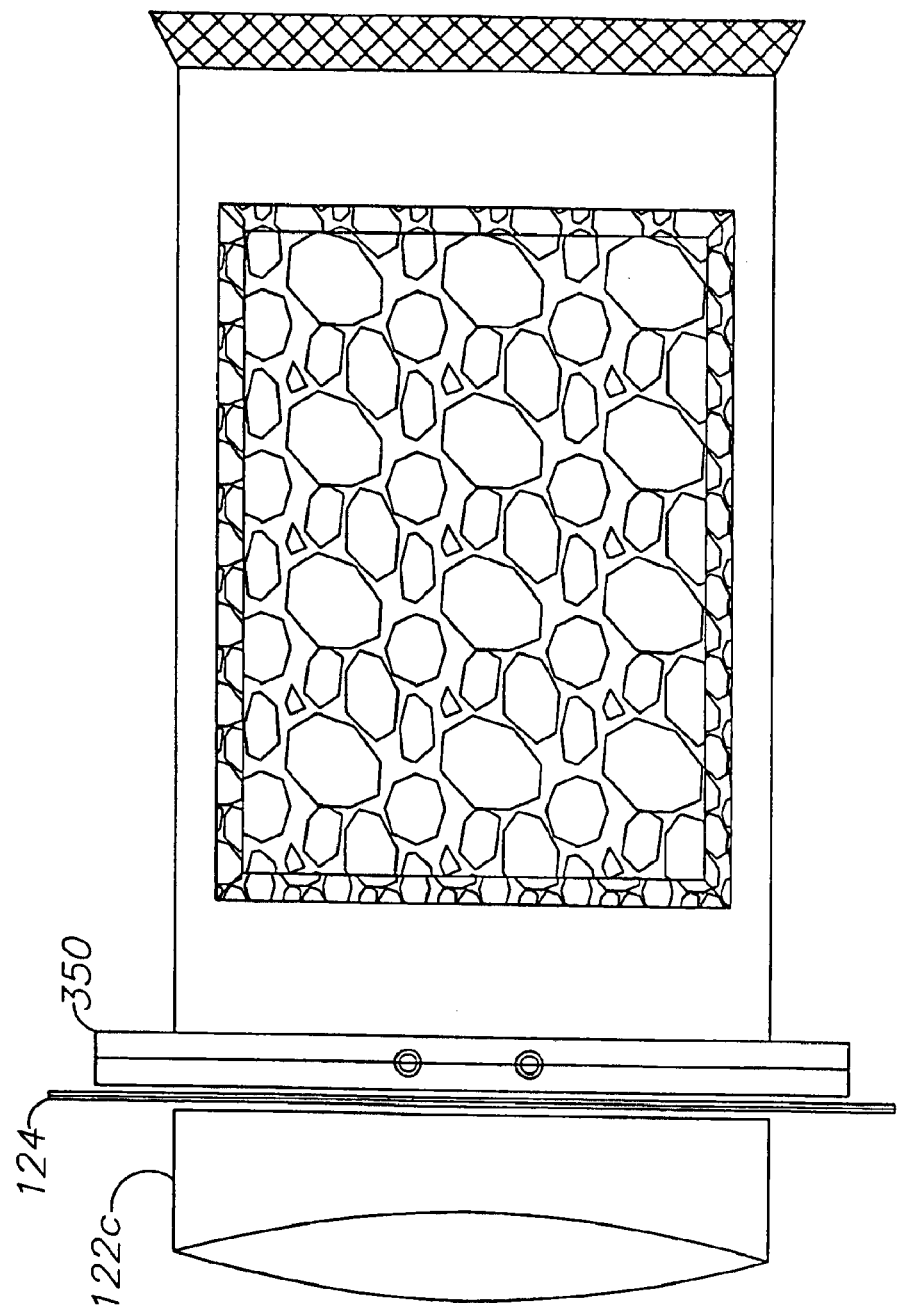
FIG. 16 is a top plan view of a rectangular product, such as a block of cheese, shown in a bag with a seal bar and cutoff blade shown in position for sealing and cutting off the bag.
Figure 17:
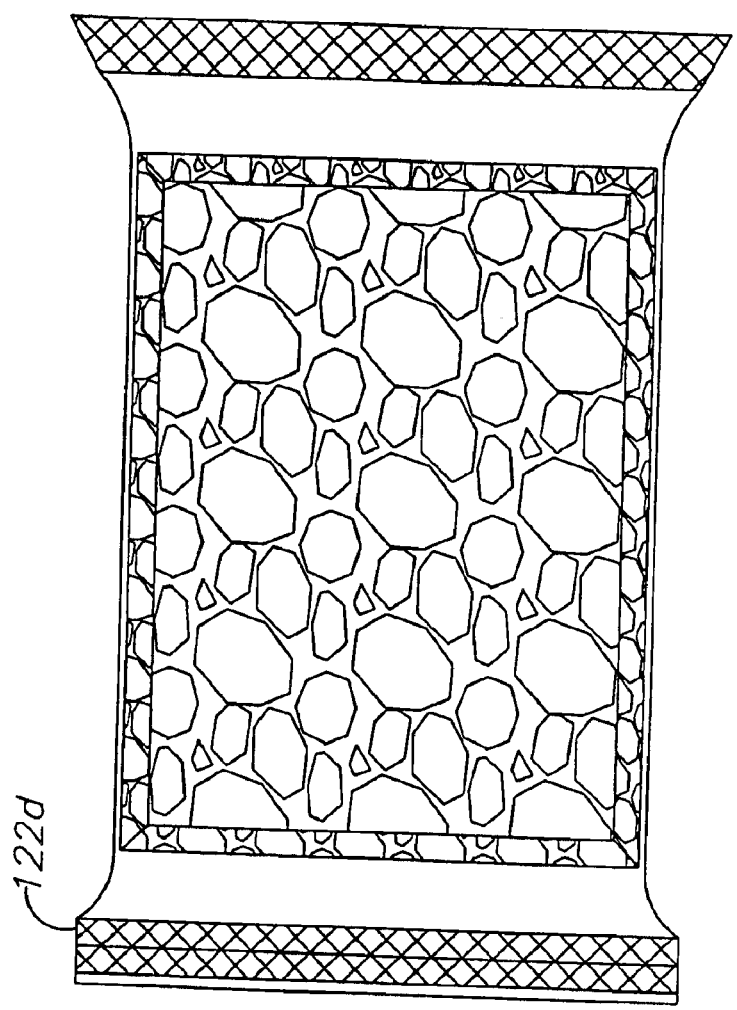
FIG. 17 is a top plan view thereof, showing the bag sealed.

FIG. 16 is a fragmentary plan view of an alternative configuration sealing bar 350. In this embodiment the sealing bar 350 is straight rather than curved as is the cutoff blade 124. The embodiment shown in FIG. 16 is advantageous for use with rectangular shaped items, such as the cheese block shown. FIG. 17 is a top view of the bag 120 of FIG. 16 with a portion of the neck 122 removed after vacuum sealing and with the bag 120 shrunk after hot water immersion.

Figure 18A:
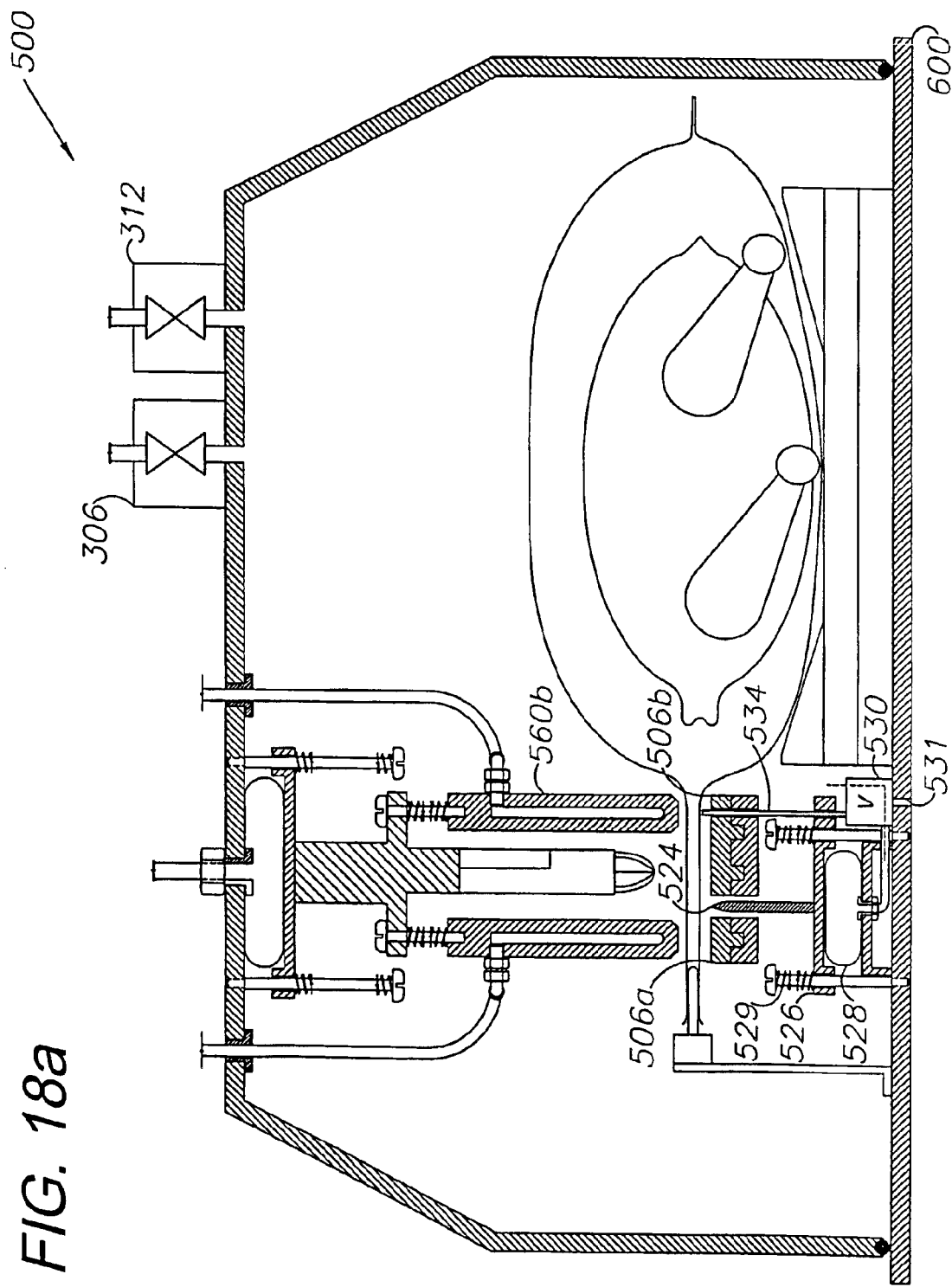
FIG. 18a is a longitudinal cross-section of a modified embodiment bag sealing unit with a modified cutoff knife assembly.
Figure 18B:
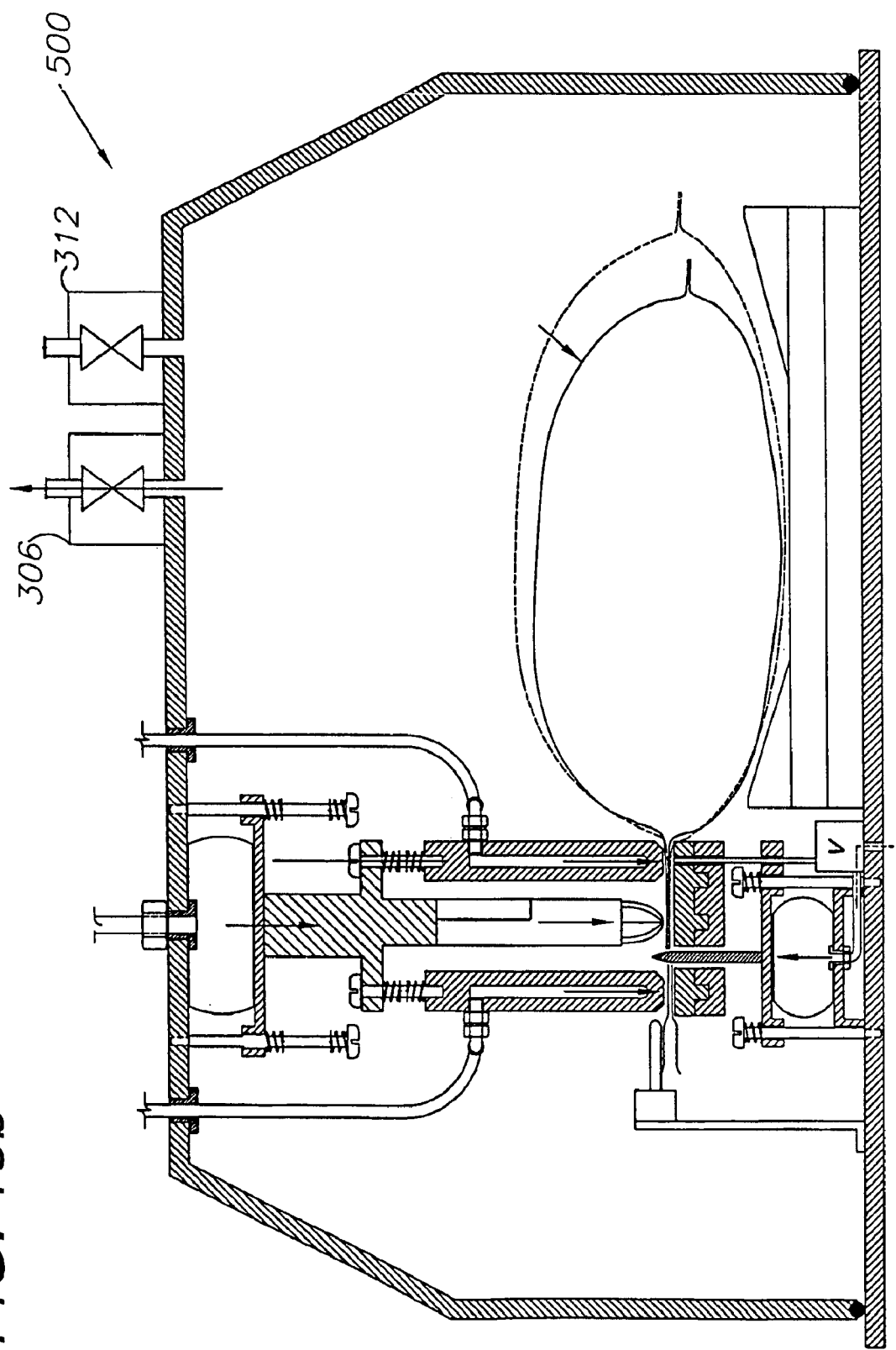
FIG. 18b is a longitudinal cross-section thereof, showing the sealing bar and the cooling plates in their lowered, engaged positions.
Figure 18C:
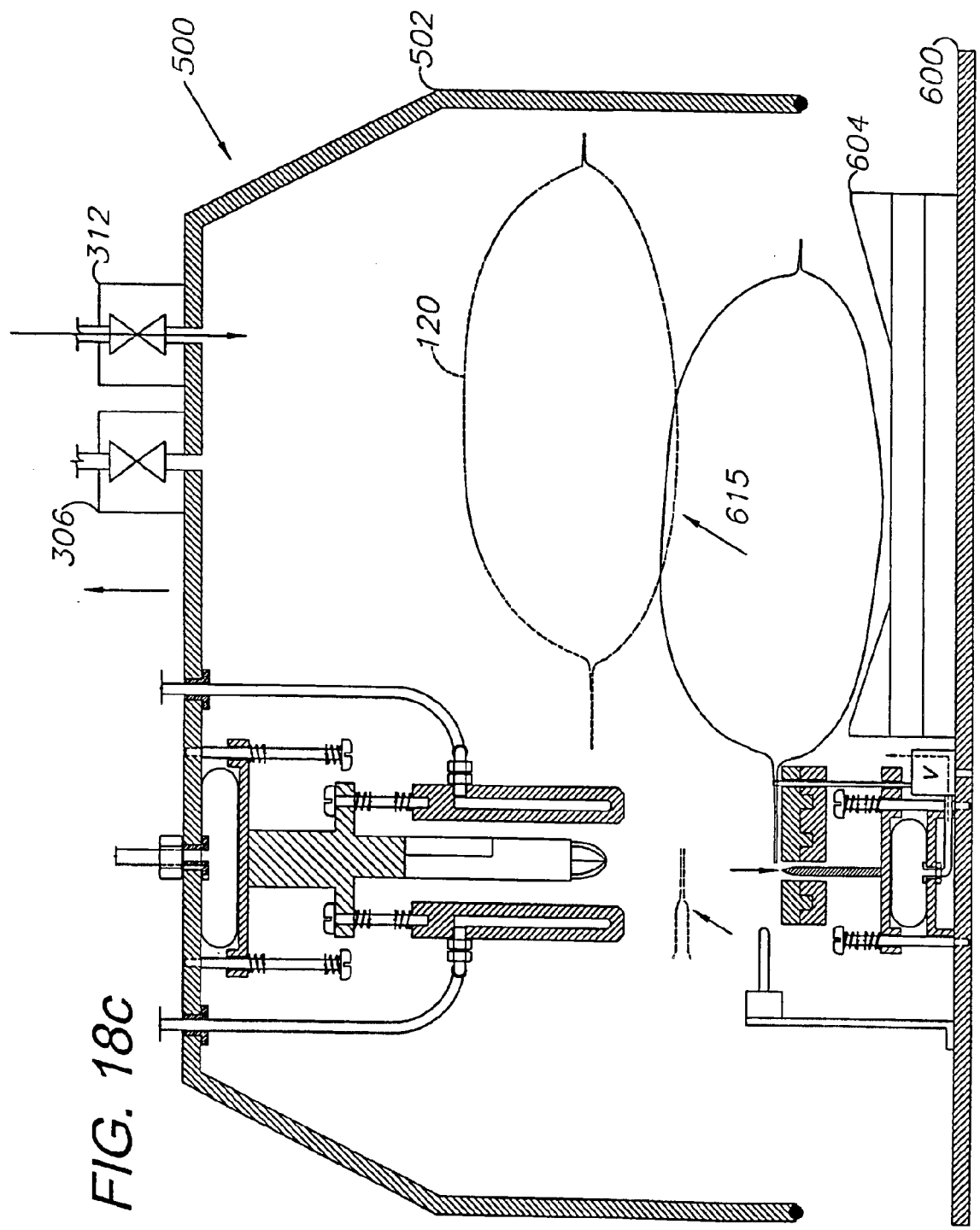
FIG. 18c is a longitudinal cross-section section thereof, showing the vacuum cover raised and the bagged product being removed.

FIGS. 18a–c illustrate an alternative embodiment of the vacuum packaging machine 500. By way of example, the illustrated embodiment differs from that illustrated in FIGS. 2a through 2c primarily in that the engagement gaskets 506a,b are fixed rather than spring-biased. Also, the cutoff blade 524 is movable rather than fixed and is mounted on a cutoff blade platform 526 mounted on bolts 528 with springs 529 biasing the cutoff blade platform 526 downwardly.

The platform 526 and the associated cutting blade 524 are moved upward during the cutting operation by means of a secondary bladder 528. Air supply to the secondary bladder 528 is regulated by a three-way valve 530. The valve 530 is activated by a pin 534. During operation of the vacuum packaging machine 500, the pin 534 is depressed by the descending cooling plate 560b. The pin 534 moves downward through the platform 526 and activates the valve 530 causing the bladder 528 to be opened to ambient air pressure outside the vacuum chamber 500 through a vent opening 531 formed in the platen 600. Due to the pressure differential between the outside (ambient) pressure and the partial vacuum within the chamber 500, the secondary bladder 528 fills with outside air, pushing the platform 526 and the cutoff blade 524 upward, and severing the neck 122 of the bag 120 as shown in FIG. 18b.

Upon activation of the vent valve 312, the chamber 500 returns to ambient atmospheric pressure, and the secondary bladder 528 is deflated by downward pressure from the platform 526 as exerted by springs 529. FIG. 18c illustrates the vacuum packaging machine 500 at the conclusion of the cycle. The cover 502 has been lifted off the platen 600 and the sealed bag 120 is shown being removed from the cradle 604. Arrow 615 indicates the upward direction of travel of the bag 120 as it is being removed.

FIG. 19 shows an alternative configuration rotary chamber system 700 comprising a circular conveyor 702 with multiple bag sealing units 106 mounted thereon in radially-spaced relation. The conveyor 702 is rotated by a motor whereby the bag sealing units 106 perform sealing operations at appropriate workstations for different steps of the process.

The components of the system 100 are preferably constructed of suitable materials, such as stainless-steel or aluminum, which can accommodate power washing for cleaning purposes and tend to resist rust and corrosion in working environments with relatively high humidity and temperature levels.

It is to be understood that while certain embodiments of the invention have been shown and described, the invention is not to be limited thereto and can assume a wide variety of alternative configurations, including different materials, sizes, components and methods of operation. Moreover, the system and method of the present invention can be adapted to various applications, including the manufacture of bags and other products from thermoplastic film, forming multiple seals on bags and sealing the sides and ends of bags.

What is claimed and desired to be secured by Letters Patent is as follows:

1. A device for sealing thermoplastic film, which comprises:
   a platen with an upper surface;
   a vacuum chamber cover including a lower rim;
   a vacuum chamber including a closed position with said cover lower rim engaging said platen upper surface and an open position with said vacuum chamber cover separated from said platen;
   a sealing support assembly mounted on said upper surface of said platen and adapted to receive thermoplastic film thereon;
   a sealing bar assembly mounted on said vacuum chamber cover and including a heated sealing bar and a heat sink plate positioned in proximity to said sealing bar in a thermal exchange relationship therewith;
   a heat source associated with said sealing bar and adapted for heating said sealing bar; and
   said sealing bar assembly being movable between a raised position disengaged from said thermoplastic film and a lowered position engaging said thermoplastic film received on said sealing support assembly.

2. The device according to claim 1 wherein said sealing bar assembly includes first and second said heat sink plates positioned on opposite sides of said sealing bar in a thermal exchange relationship therewith, said sealing bar including a lower edge, in its raised position said sealing bar being retracted relative to said heat sink plates, and said sealing bar lower edge engaging said thermoplastic film with said sealing bar in its lowered position.

3. The device according to claim 2, which includes:
   each said heat sink plate including a respective lower edge; and
   said sealing bar assembly including a raised position with said plate lower edges spaced above said thermoplastic film and a lowered position with said plate lower edges engaging said thermoplastic film and clamping same against said sealing support assembly.

4. The device according to claim 3, which includes:
   said sealing bar assembly including an air bladder connected to said sealing bar and said heat sink plates, said air bladder having a deflated configuration with said sealing bar assembly in its raised position and an inflated configuration with said sealing bar assembly in its lowered position; and
   a compressed air source connected to said bladder and adapted for inflating same.

5. The device according to claim 4 wherein said sealing bar assembly includes a spring suspension connecting said heat sink plates to said sealing bar, said spring suspension biasing said sealing bar towards its retracted position with said sealing bar assembly raised and compressing with said sealing bar and heat sink plate lower edges engaging said thermoplastic film in said lowered position.

6. The device according to claim 1, which includes:
   said heat sink plate having a coolant passage extending therethrough; and
   a coolant source connected to said coolant passage and adapted to circulate coolant therethrough.

7. The device according to claim 1 wherein said heat source comprises an electrical resistance heater imbedded in said sealing bar and adapted for connection to an electrical power source.

8. The device according to claim 1, which includes:
   said sealing support assembly including a cutoff blade and an engagement gasket adapted for clamping said thermoplastic film against said sealing bar assembly with said sealing bar assembly in its lowered position, said sealing bar assembly pushing said thermoplastic film over said cutoff blade in said lowered position.

9. The device according to claim 1 wherein said sealing support assembly includes:
   an engagement gasket adapted for clamping said thermoplastic film against said sealing bar assembly with said sealing bar assembly in its lowered position;
   a cutoff blade having a lowered position retracted in said sealing support assembly and an extended position projecting therefrom;
   an air bladder having a deflated configuration with said cutoff blade in its lowered position and an inflated configuration with said cutoff blade in its extended position; and
   a three-way valve including an actuator actuated by said sealing bar assembly between a first position admitting air into said bladder and a second position discharging air from said bladder.

10. The device according to claim 1, which includes:
    said thermoplastic film forming a bag with an open neck;
    a neck retention structure mounted in proximity to said sealing support assembly and including a pair of neck retention pins each adapted for placement in said open neck for holding same open until sealed by said sealing bar; and
    said neck retention structure including a pair of springs each biasing a respective neck retention pin outwardly in said open neck.

11. The device according to claim 1, which includes:
    said sealing support assembly being mounted on said platen upper surface;
    a cradle mounted on said platen upper surface adjacent to said sealing support assembly, said cradle being adapted to receive a thermoplastic film bag with an item to the bagged located therein and with an open neck of said bag being placed on said sealing support assembly prior to sealing same; and said sealing bar assembly being matted on said vacuum chamber cover generally within said vacuum chamber.

12. The device according to claim 1, wherein said vacuum chamber cover includes:

a discharge air valve adapted for selectively discharging air from said vacuum chamber; and an inlet air valve adapted for selectively admitting air to said vacuum chamber.

13. The device according to claim 1 wherein said sealing bar is substantially continuously heated during operation.

14. The device according to claim 1, which includes:

a microprocessor controller connected to said device and adapted for controlling timing, temperature and pressure operating parameters of said device.

15. The device according to claim 14, which includes:

a sensor connected to said microprocessor and adapted for sensing an operating condition of said device whereby said microprocessor responds to input from said sensor and modifies the operation of the device accordingly.

16. A system for sealing product in thermoplastic film bags including bag necks, which system comprises:

a conveyor including a movable surface;

a platen mounted on said conveyor surface and including an upper platen surface;

a vacuum chamber cover adapted for selectively mounting on said platen upper surface and forming a vacuum chamber with said platen;

a cradle mounted on said platen upper surface and adapted to receive a thermoplastic film bag with an item to be bagged located therein;

a sealing support assembly mounted on said platen upper surface in proximity to said cradle and including an engagement gasket adapted to receive a bag neck thereon prior to sealing same;

said sealing support assembly including a cutoff blade with a lowered position retracted below said engagement gasket and an extended position projecting upwardly therefrom;

said sealing support assembly further including a cutoff blade air bladder connected to said cutoff blade and having a deflated configuration with said cutoff blade in its lowered position and an inflated configuration with said cutoff blade in its extended position;

said sealing support assembly further including a three-way valve having a first position admitting air into said cutoff blade air bladder, a second position discharging air therefrom and an actuator connected to and selectively moving said valve between its positions;

a sealing bar assembly including a heated sealing bar and first and second heat sink plates positioned in proximity to said sealing bar in a thermal exchange relationship therewith;

said sealing bar assembly being movable between a raised position disengaged from a respective bag neck and a lowered position engaging same, said sealing bar assembly in its lowered position actuating said valve actuator and moving said valve to its first position;

said sealing bar including a lower contact surface engaging and sealing a respective bag neck with the sealing bar assembly in its lowered position;

each said heat sink plate including a respective lower edge engaging a respective bag neck and clamping same against said sealing support assembly with the sealing bar assembly in its lowered position;

said sealing bar assembly including a sealing bar air bladder connected to said sealing bar and said heat sink plates, said sealing bar air bladder having a deflated configuration with said sealing bar assembly in its raised position and an inflated configuration with said sealing bar assembly in its lowered position;

a compressed air source selectively connected to said air bladders and adapted for inflating same;

said sealing bar assembly including a spring suspension connecting said heat sink plates and said sealing bar, said spring suspension biasing said sealing bar towards a retracted position with said sealing bar assembly raised and compressing with said sealing bar contact surface and said heat sink plate lower edges engaging said thermoplastic film in said sealing bar assembly lowered position;

each said heat sink plate having a coolant passage extending therethrough;

a coolant source connected to said coolant passage and adapted to circulate coolant therethrough;

a heat source comprising an electrical resistance heater imbedded in said sealing bar and adapted for connection to an electrical power source;

a sensor connected to said vacuum chamber and providing an output signal corresponding to an operating parameter associated with said system; and a microprocessor connected to said sensor for receiving the output signal therefrom as input, said microprocessor controlling operation of said system operating parameter.

17. The system according to claim 16 wherein said conveyor has an endless belt configuration.

18. The system according to claim 16 wherein said conveyor has a circular configuration and is rotatable.

19. A device for sealing thermoplastic film, which comprises:

a sealing support assembly adapted to receive thermoplastic film thereon;

a sealing bar assembly including a heated sealing bar and a heat sink plate positioned in proximity to said sealing bar in a thermal exchange relationship therewith;

a heat source associated with said sealing bar and adapted for heating same;

said sealing bar assembly being movable between a raised position disengaged from said thermoplastic film and a lowered position engaging same;

an engagement gasket adapted for clamping said thermoplastic film against said sealing bar assembly with said sealing bar assembly in its lowered position;

a cutoff blade having a lowered position retracted in said sealing support assembly and an extended position projecting therefrom;

an air bladder having a deflated configuration with said cutoff blade in its lowered position and an inflated configuration with said cutoff blade in its extended position; and a three-way valve including an actuator actuated by said sealing bar assembly between a first position admitting air into said bladder and a second position discharging air from said bladder.

20. A method of sealing thermoplastic bags with open necks and product located therein, which comprises the steps of:

provyding a moving conveyor with an upper surface;

mounting a plurality of bag sealing units on said conveyor at corresponding workstations;

providing each said bag sealing unit with a platen mounted on said conveyor upper surface and including a platen upper surface;

providing each said bag sealing unit with a vacuum chamber cover;

placing a packaged product in a thermoplastic bag through an open neck thereof;

placing the bag on the platen;

providing a sealing support assembly on the platen upper surface;

placing the bag neck on the sealing support assembly;

placing the vacuum chamber cover on said platen upper surface and forming a vacuum chamber therein;

evacuating said vacuum chamber to form a partial vacuum therein;

providing said vacuum chamber cover with a sealing bar assembly including a sealing bar and a pair of heat sink plates on each side of the sealing bar;

continuously heating said sealing bar;

radiating heat from said sealing bar to said heat sink plates;

circulating a coolant through said heat sink plates;

lowering said sealing bar assembly onto said bag neck and clamping same against said sealing support assembly with said heat sink plates;

melding said bag neck closed across a sealed area with said sealing bar;

raising said sealing bar assembly from said sealed bag neck;

admitting air into said vacuum chamber to release the vacuum therein;

lifting said vacuum chamber cover from said platen;

discharging said bag with said product sealed therein from said platen;

heat shrinking said thermoplastic bag onto said product packaged therein;

providing a microcomputer controller;

connecting said controller to said bag sealing units;

preprogramming said controller to control bag sealing unit operating parameters consisting of time, temperature and pressure; and controlling said operating parameters with said controller.

* * * * *